US012643624B2

(12) United States Patent
Roh

(10) Patent No.:  US 12,643,624 B2
(45) Date of Patent:  Jun. 2, 2026

(54) SEPARABLE BICYCLE AND SEPARABLE BICYCLE FRAME

(71) Applicant: Il Hoon Roh, Gyeonggi-do (KR)

(72) Inventor: Il Hoon Roh, Gyeonggi-do (KR)

( * ) Notice: Subject to any disclaimer, the term of this patent is extended or adjusted under 35 U.S.C. 154(b) by 842 days.

(21) Appl. No.: 17/802,524

(22) PCT Filed: Feb. 17, 2021

(86) PCT No.: PCT/KR2021/002012
§ 371 (c)(1),
(2) Date: Aug. 25, 2022

(87) PCT Pub. No.: WO2021/172806
PCT Pub. Date: Sep. 2, 2021

(65) Prior Publication Data
US 2023/0098423 A1 Mar. 30, 2023

(30) Foreign Application Priority Data
Feb. 27, 2020 (KR) ........................ 10-2020-0024331

(51) Int. Cl.
*B62K 15/00* (2006.01)
*B62K 3/04* (2006.01)
*B62K 21/24* (2006.01)
(52) U.S. Cl.
CPC .............. *B62K 15/006* (2013.01); *B62K 3/04* (2013.01); *B62K 21/24* (2013.01); *B62K 2015/001* (2013.01)
(58) Field of Classification Search
CPC ........ B62K 15/006; B62K 3/04; B62K 21/24; B62K 2015/001; B62K 15/00; B62K 19/30; F16B 7/10

(Continued)

(56) References Cited

U.S. PATENT DOCUMENTS 6,364,334 B1 4/2002 Kuba
7,722,070 B2 * 5/2010 Ritchey .................. B62K 15/00
280/278

(Continued)

FOREIGN PATENT DOCUMENTS

CN 107776788 A * 3/2018 ........... B62K 15/006
DE 19738971 4/1999

(Continued)

OTHER PUBLICATIONS

"Search Report of Europe Counterpart Application", issued on Jan. 20, 2025, pp. 1-22.

(Continued)

*Primary Examiner* — Valentin Neacsu
*Assistant Examiner* — Morgan Knauf
(74) *Attorney, Agent, or Firm* — JCIPRNET

(57) ABSTRACT

The present disclosure relates to a separable bicycle and a separable bicycle frame, which are capable of facilitating transport and storage, and each of the separable bicycle and the separable bicycle frame includes a head tube capable of receiving a handle stem, a seat tube accommodating a seat post on which a seat is installed, a top frame connecting an upper portion of the seat tube to the head tube, and a down frame connecting a lower portion of the seat tube to the head tube, wherein, in order for the head tube connected to a front wheel and the seat tube connected to a rear wheel to be completely separated from each other, a top fastening portion is installed in a middle of the top frame and a down fastening portion is installed in a middle of the down frame.

10 Claims, 34 Drawing Sheets

(58) Field of Classification Search
USPC ........................................................ 280/287
See application file for complete search history.

(56) References Cited

U.S. PATENT DOCUMENTS

| | | | |
|---|---|---|---|
| 8,899,607 B2 | 12/2014 | Hon et al. | |
| 9,580,130 B2 | 2/2017 | Perkins | |
| 10,024,357 B1 * | 7/2018 | Juhas | B62K 19/30 |
| 2006/0055131 A1 * | 3/2006 | Elfandi | B62K 15/00 |
| | | | 280/29 |
| 2007/0120342 A1 * | 5/2007 | Daniels | B62K 15/00 |
| | | | 280/287 |
| 2009/0256330 A1 | 10/2009 | Daniels | |
| 2017/0341700 A1 * | 11/2017 | Cole | B62K 15/006 |

FOREIGN PATENT DOCUMENTS

| | | | | |
|---|---|---|---|---|
| EP | 3342692 | 7/2018 | | |
| FR | 388908 | 8/1908 | | |
| FR | 2203347 | 5/1974 | | |
| GB | 2130982 | 6/1984 | | |
| GB | 2130982 A * | 6/1984 | | B62K 15/00 |
| GB | 2569085 A * | 6/2019 | | B62K 15/006 |
| IT | 201700030514 | 9/2018 | | |
| JP | 6195136 | 9/2017 | | |
| JP | 2017202817 | 11/2017 | | |
| KR | 200299060 | 1/2003 | | |
| WO | WO-2015166000 A1 * | 11/2015 | | B62K 15/008 |
| WO | 2017046856 | 3/2017 | | |

OTHER PUBLICATIONS

"Search Report of Europe Counterpart Application", issued on Aug. 20, 2024, p. 1-p. 16.
"International Search Report (Form PCT/ISA/210) of PCT/KR2021/002012", mailed on May 28, 2021, with English translation thereof, pp. 1-4.
"Office Action of Korea Counterpart Application No. 10-2020-0024331", issued on May 19, 2021, with English translation thereof, p. 1-p. 8.
"Office Action of Korea Counterpart Application No. 10-2020-0024331", issued on Nov. 19, 2021, with English translation thereof, p. 1-p. 9.
"Office Action of Korea Counterpart Application No. 10-2020-0024331", issued on Jun. 7, 2022, with English translation thereof, p. 1-p. 4.

* cited by examiner

SEPARABLE BICYCLE AND SEPARABLE BICYCLE FRAME

TECHNICAL FIELD

The present disclosure relates to a separable bicycle and a separable bicycle frame, and more particularly, to a separable bicycle and a separable bicycle frame, which are capable of facilitating transport and storage.

BACKGROUND ART

In general, a bicycle has a configuration that connects a front wheel portion to a rear wheel portion with a frame, and the length in the front and rear directions is overall longer.

Due to this, it is very difficult to transport the bicycle in a narrow elevator or in the luggage compartment of a general passenger car.

Therefore, in order to solve this problem, a folding bicycle has been developed that reduces the length thereof by folding the center of a frame so that a front wheel portion and a rear wheel portion overlap each other.

However, this conventional folding bicycle has a structure in which only the frame is folded while the brake wire and the shift wire are connected to the frame as they are. Thus, because it is impossible to completely separate the front wheel portion and the rear wheel portion, it is impossible to transport or store the front wheel portion and the rear wheel portion separately. In addition, because there is a limit to the ability to reduce the space by only folding the frame once, the diameter of the wheels must be very small in order to be placed in the luggage compartment of a general passenger car, and in general, it is difficult to put a general bicycle with a large wheel diameter into a general passenger car other than a special car with a large luggage compartment.

In addition, because a folding portion of the conventional folding bicycle is structurally weak, the conventional folding bicycle has many problems, such as relatively increased weight and poor safety, although the length is reduced due to mechanical reinforcement.

The biggest problem in the production of existing bicycles is the separation and recombination of gears and brake wires. An existing bicycle is not used for general commuting to work because it takes a long time to separate the front and rear parts of the existing bicycle and to separate and reassemble the brake and the gear shift wire of the existing bicycle and portability is greatly reduced.

In particular, there are precedents that companies, which adopted a separable frame method because it took a long time to separate and reassemble the brake and the gear shift wire, released bikes without rear brakes and gear shifter.

In the prior art, in order to alleviate the inconvenience of such a folding bicycle, a separable wheel bicycle in which only the front wheel may be separable has been developed. However, in the case of the separable wheel bicycle in which only the front wheel may be separable, when the front wheel thereof is reassembled and used again after disassembly, the alignment of the front wheel may be misaligned, and because the existing frame is the same, even when the front wheel is detached, the rear wheel takes up a large volume, and thus, it is still difficult to put the separable wheel bicycle in the luggage compartment of a passenger car.

DESCRIPTION OF EMBODIMENTS

Technical Problem

The present disclosure is to solve various problems including the above problems, and an object of the present disclosure is to provide a separable bicycle and a separable bicycle frame in which a front wheel portion supporting a front wheel and a rear wheel portion supporting a rear wheel may be completely separated from each other and thus may be transported and stored separately to thereby increase space utilization, it is possible to separate wires by using a wire separation device, the space may be reduced as much as possible by folding the frame once more by using a plurality of joints when temporarily fixing the front and rear wheel portions to overlap each other after the complete separation, a wheel alignment operation or a wire tension readjustment operation is unnecessary when reconnecting the front wheel portion to the rear wheel portion, thereby facilitating the use thereof, structurally strong strength and durability may be provided by using a reinforcing bar, and alignment and fixing of a handle stem may be performed easily. However, these problems are examples, and the scope of the present disclosure is not limited thereto.

Solution to Problem

A separable bicycle according to the inventive concept of the present disclosure for solving the above problems includes a head tube capable of receiving a handle stem, a seat tube accommodating a seat post on which a seat is installed, a top frame connecting an upper portion of the seat tube to the head tube, and a down frame connecting a lower portion of the seat tube to the head tube, wherein, in order for the head tube connected to a front wheel and the seat tube connected to a rear wheel to be completely separated from each other, a top fastening portion is installed in the middle of the top frame and a down fastening portion is installed in the middle of the down frame.

A separable bicycle frame according to the inventive concept of the present disclosure for solving the above problems includes a head tube capable of receiving a handle stem, a seat tube accommodating a seat post on which a seat is installed, a top frame connecting an upper portion of the seat tube to the head tube, and a down frame connecting a lower portion of the seat tube to the head tube, wherein, in order for the head tube connected to a front wheel and the seat tube connected to a rear wheel to be completely separated from each other, a top fastening portion is installed in the middle of the top frame and a down fastening portion is installed in the middle of the down frame.

Advantageous Effects of Disclosure

According to various embodiments of the present disclosure made as described above, a front wheel portion supporting a front wheel and a rear wheel portion supporting a rear wheel may be completely separated from each other and thus may be transported and stored separately to thereby increase space utilization, it is possible to separate wires by using a wire separation device, the space may be reduced as much as possible by folding the frame once more by using a plurality of joints when temporarily fixing the front and rear wheel portions to overlap each other after complete separation, a wheel alignment operation or a wire tension readjustment operation is unnecessary when reconnecting the front wheel portion to the rear wheel portion, thereby facilitating the use thereof, structurally strong strength and durability may be provided by using a reinforcing bar, and alignment and fixing of a handle stem may be performed easily. However, the scope of the present disclosure is not limited by these effects.

BRIEF DESCRIPTION OF DRAWINGS

FIG. 4 is a plan view illustrating the separable bicycle of FIG. 1.

FIG. 12 is a plan view illustrating the separable bicycle of FIG. 10.

BEST MODE

Figure 1:
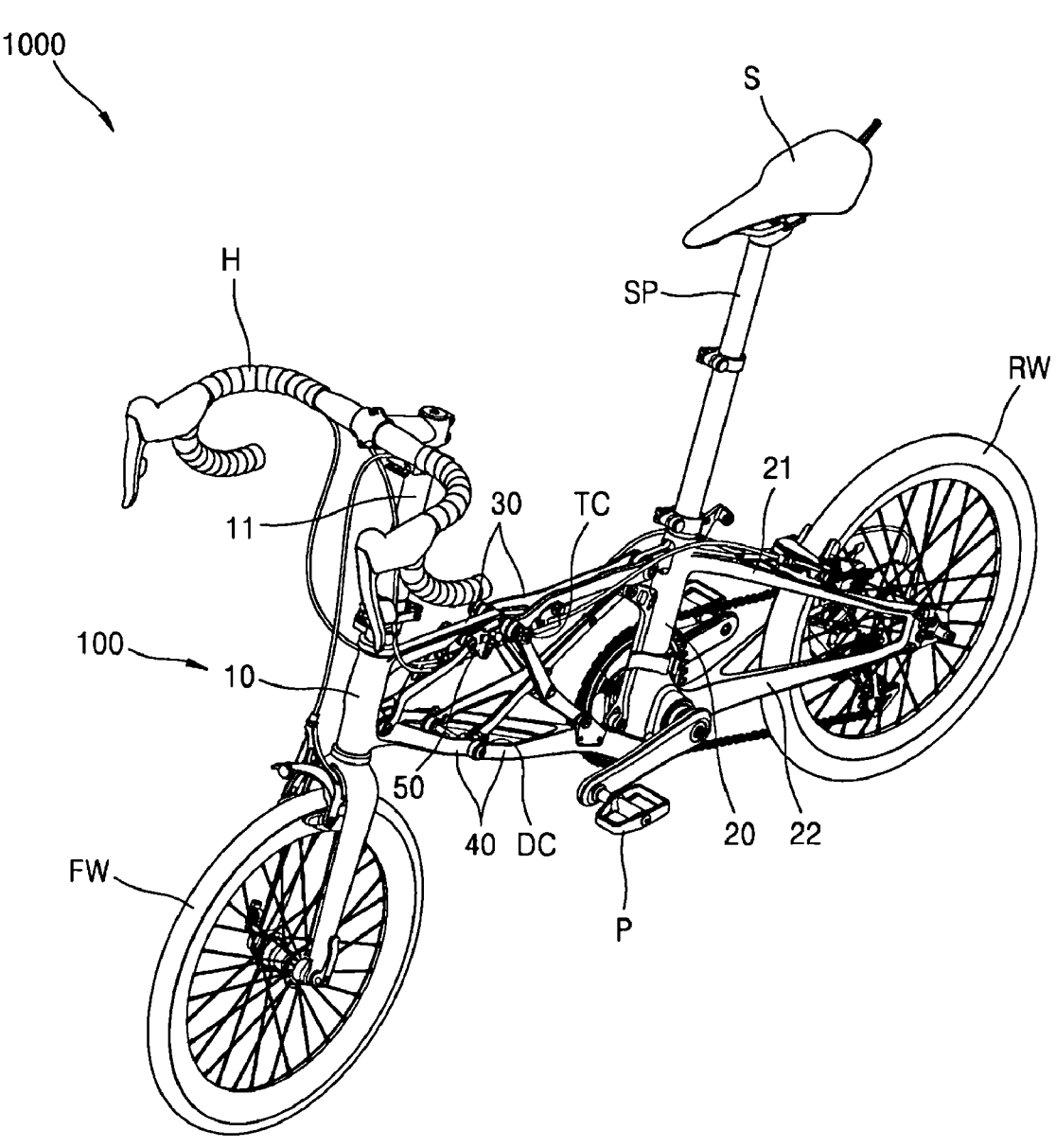
FIG. 1 is a perspective view illustrating a use state of a separable bicycle according to some embodiments of the present disclosure.

A separable bicycle according to the inventive concept of the present disclosure for solving the above problems includes a head tube capable of receiving a handle stem, a seat tube accommodating a seat post on which a seat is installed, a top frame connecting an upper portion of the seat tube to the head tube, and a down frame connecting a lower portion of the seat tube to the head tube, wherein, in order for the head tube connected to a front wheel and the seat tube connected to a rear wheel to be completely separated from each other, a top fastening portion is installed in the middle of the top frame and a down fastening portion is installed in the middle of the down frame.

The top frame may include a front top bar having one end connected to an upper portion of the head tube and the other end in which a first coupling portion is formed so that the other end is to be fastened by the top fastening portion, and a rear top bar having one end connected to an upper portion of the seat tube and the other end in which the top fastening portion having a first fastening shaft fastened to the first coupling portion and a fastening lever capable of pressing the first fastening shaft is formed, and the down frame may include a front down bar having one end connected to a lower portion of the head tube and the other end in which a second coupling portion is formed so that the other end is to be fastened by the down fastening portion, and a rear down bar having one end connected to a lower portion of the seat tube and the other end in which the down fastening portion having a second fastening shaft fastened to the second coupling portion is formed.

The first coupling portion may be a C-shaped groove, and the second coupling portion may be an inverted U-shaped groove.

The separable bicycle may further include a reinforcing bar formed in an X-shape or a diagonal shape as a whole between the rear top bar and the rear down bar to reinforce the strength and durability of the rear top bar and the rear down bar.

The reinforcing bar may include one or more of a first branch bar connecting a front of the rear top bar to a rear of the rear down bar or a lower side of the seat tube and branched in a Y-shape, a second branch bar connecting a front of the rear down bar to an upper side of the seat tube or a rear of the rear top bar and branched in a Y-shape, the second branch bar passing through a branching space of the first branch bar to be supported in an X-shape as a whole together with the first branch bar, and a combination of the first branch bar and the second branch bar.

In order for the rear top bar, the rear down bar, the first branch bar, and the second branch bar to be folded from top to bottom to reduce space during storage, the reinforcing bar may further include a third foldable bar that is linked between the seat tube and the second branch bar and foldable, wherein a joint portion may include one or more of first to fifth joint portions and a combination thereof, wherein the first joint portion may be formed at a rear of the rear top bar, the second joint portion may be formed at a rear of the rear down bar, the third joint portion may be formed at a rear of the first branch bar, the fourth joint portion may be formed at a rear of the second branch bar, and the fifth joint portion may be formed at a rear of the third foldable bar.

The separable bicycle may further include a wire separation device installed on the top frame or the down frame and capable of completely separating various wires into a front wire and a rear wire.

The wire separation device may include a front fixing portion installed on the front top bar and having one side on which a guide rail is formed, a front movable portion formed to be movable forward and backward along the guide rail of the front fixing portion and having one side on which a restraining protrusion is formed, a tip protrusion installed on the front movable portion and to which the front wire is fixed by a fixing screw, a rotating cam plate rotatably linked to a link shaft of the front fixing portion, an arc-shaped cam hole for constraining and guiding the restraining protrusion formed on one side of the rotating cam plate so that the front movable portion is temporarily moved backward during rotation of the rotating cam plate and thus the tip protrusion is in a release mode, a clasp that is capable of being engaged with the tip protrusion in a locking mode, a rear movable portion that is movable forward and backward together with the clasp in the locking mode of the clasp and to which the rear wire is fixed, a rear fixing portion installed on the rear top bar and in which a guide rod or guide rail capable of guiding forward and backward movement of the rear movable portion is formed, and a safety pressing pin having one side on which a body portion is formed and the other side on which a neck portion is formed, wherein the body portion corresponds to a wide portion of an arc-shaped multi-width hole formed in the rotation cam plate in normal times so that the rotation cam plate is capable of being rotated only during a pressing operation, and the neck portion is formed on the other side of the safety pressing pin so as to correspond to a narrow portion of the arc-shaped multi-width hole while moving backward during the pressing operation.

The handle stem may have a C-shaped stem groove formed on one side thereof in order to separate the handle stem from the head tube and turn the handle stem over so that a handle faces downward, and to fasten the handle stem to the first fastening shaft of the rear top bar and fasten the handle stem with the fastening lever.

The separable bicycle may further include a handle stem fixing device fixing the handle stem to the head tube, wherein the handle stem fixing device may include a first lever having one end which is rotatably installed on one side of the head tube, a middle portion in which an alignment protrusion, which is inserted into an alignment groove, formed in the handle stem, during the tightening rotation in a direction of the handle stem, is formed, and the other end in which a first release lever and a fastening protrusion are formed, and a second lever having one end in which a hook engaged with the fastening protrusion of the first lever is formed, a middle portion which is rotatably installed on the other side of the head tube, and the other end in which a second lever is formed.

The separable bicycle may further include a temporary fixing device installed between the head tube and the seat tube to temporarily fix the front wheel and the rear wheel to each other so that the front wheel and the rear wheel separated from each other are capable of being stored overlapping each other.

The temporary fixing device may include a first fastening portion installed on one or more of a rear wheel mount portion, a seat stay, a chain stay, and a combination thereof, which rotationally support the rear wheel, and having a first insertion hole corresponding to a tip of a first protrusion so that the first protrusion, which is installed on a front wheel mount portion, is inserted into the first insertion hole, a second fastening portion installed in an upper portion of the seat tube and having a second insertion hole corresponding to a second protrusion so that the second protrusion, which is installed in an upper portion of the head tube, is inserted into the second insertion hole, and a third fastening portion installed in a lower portion of the seat tube and having a third insertion groove corresponding to a third protrusion so that the third protrusion, which is installed on the front top bar, is forcedly inserted into the third insertion groove.

The first protrusion may be a conical elastic protrusion installed with a spring and the first insertion hole may be a circular hole, the second protrusion may be a round-headed hexagonal protrusion or a polygonal protrusion and the second insertion hole may be a hexagonal hole or a polygonal hole, and the third protrusion may be a spherical protrusion and the third insertion groove may be a force-fitting elastic string groove portion.

A separable bicycle frame according to the inventive concept of the present disclosure for solving the above problems includes a head tube capable of receiving a handle stem, a seat tube accommodating a seat post on which a seat is installed, a top frame connecting an upper portion of the seat tube to the head tube, and a down frame connecting a lower portion of the seat tube to the head tube, wherein, in order for the head tube connected to a front wheel and the seat tube connected to a rear wheel to be completely separated from each other, a top fastening portion is installed in the middle of the top frame and a down fastening portion is installed in the middle of the down frame.

MODE OF DISCLOSURE

Hereinafter, several preferred embodiments of the present disclosure will be described in detail with reference to the accompanying drawings.

Embodiments of the present disclosure are provided to more completely explain the present disclosure to those of ordinary skill in the art, and the following embodiments may be modified in various other forms and the scope of the present disclosure is not limited to the following embodiments. Rather, these embodiments are provided in order to more fully complete the present disclosure, and to fully convey the inventive concept of the present disclosure to those skilled in the art. In addition, in the drawings, the thickness or size of each layer is exaggerated for convenience and clarity of description.

Terms used herein are used to describe specific embodiments, not to limit the present disclosure. As used herein, a singular form may include a plural form unless the context clearly dictates otherwise. Also, as used herein, "comprise" and/or "comprising" refers to specifying the presence of recited shapes, numbers, steps, operations, members, elements, and/or groups thereof, and does not exclude the presence or addition of one or more other shapes, numbers, operations, members, elements and/or groups.

Hereinafter, embodiments of the present disclosure will be described with reference to the drawings schematically illustrating ideal embodiments of the present disclosure. In the drawings, variations of illustrated shapes may be envisaged, for example depending on manufacturing technology and/or tolerances. Accordingly, embodiments of the inventive concept of the present disclosure should not be construed as being limited to the specific shape of a region shown in the present specification, but should include, for example, changes in shape caused by manufacturing.

FIG. 1 is a perspective view illustrating a use state of a separable bicycle 1000 according to some embodiments of the present disclosure.

First, as shown in FIG. 1, the separable bicycle 1000 according to some embodiments of the present disclosure may include a head tube 10, a seat tube 20, a top frame 30, and a down frame 40. The head tube 10 may accommodate a handle stem 11 having a handle H installed thereon and connected to a front wheel FW. The seat tube 20 is connected to a rear wheel RW by using a seat stay 21 or a chain stay 22, accommodates a seat post SP having a seat S installed thereon, and may support a pedal P. The top frame 30 connects an upper portion of the seat tube 20 to the head tube 10, and the down frame 40 connects a lower portion of the seat tube 20 to the head tube 10.

In addition, for example, in the separable bicycle 1000 according to some embodiments of the present disclosure, in order for the head tube 10 connected to the front wheel FW and the seat tube 20 connected to the rear wheel RW to be completely separated from each other, a top fastening portion TC may be installed in the middle of the top frame 30 and a down fastening portion DC may be installed in the middle of the down frame 40.

Accordingly, in the separable bicycle 1000 according to some embodiments of the present disclosure, when the top fastening portion TC and the down fastening portion DC are separated, a front wheel portion on which the head tube 10 is installed and a rear wheel portion on which the seat tube 20 is installed may be completely separated from each other.

Figure 2:
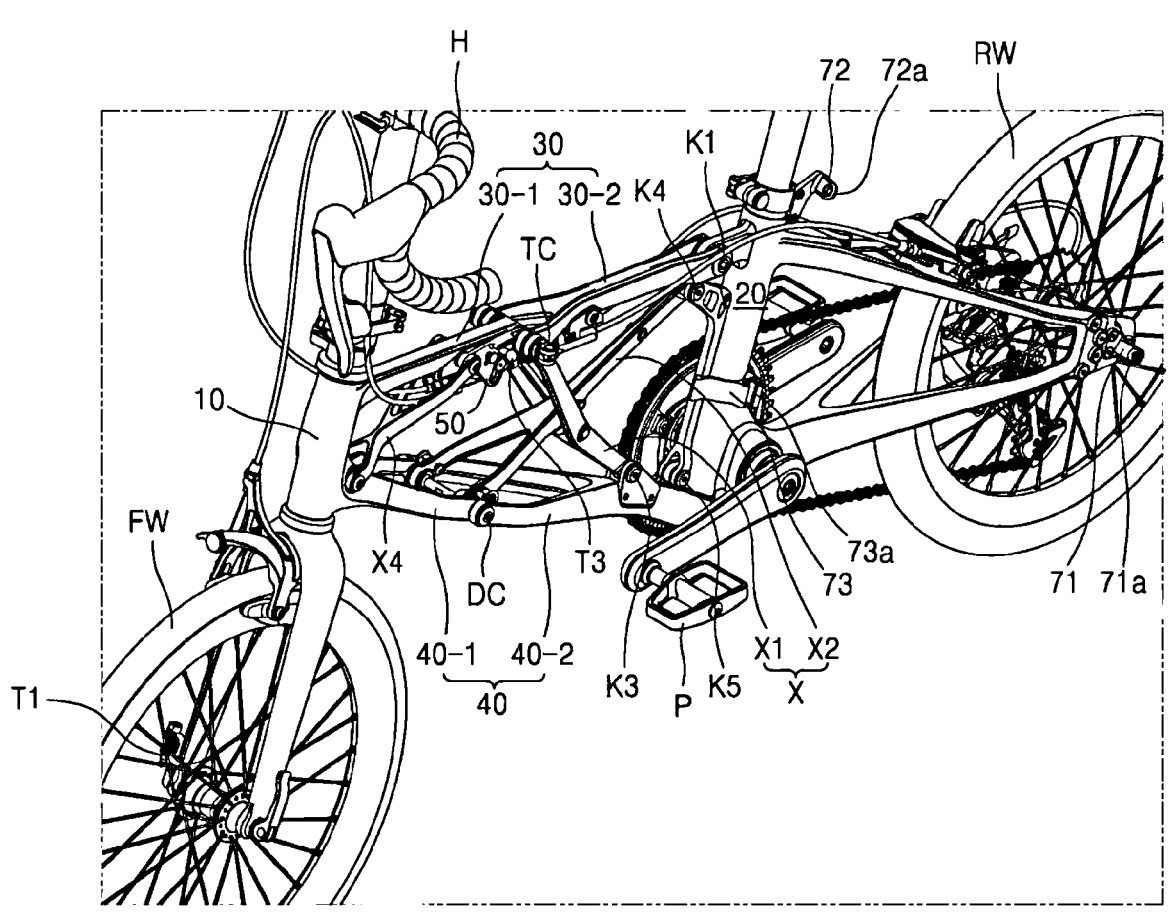
FIG. 2 is an enlarged external perspective view illustrating the separable bicycle of FIG. 1.
Figure 3:
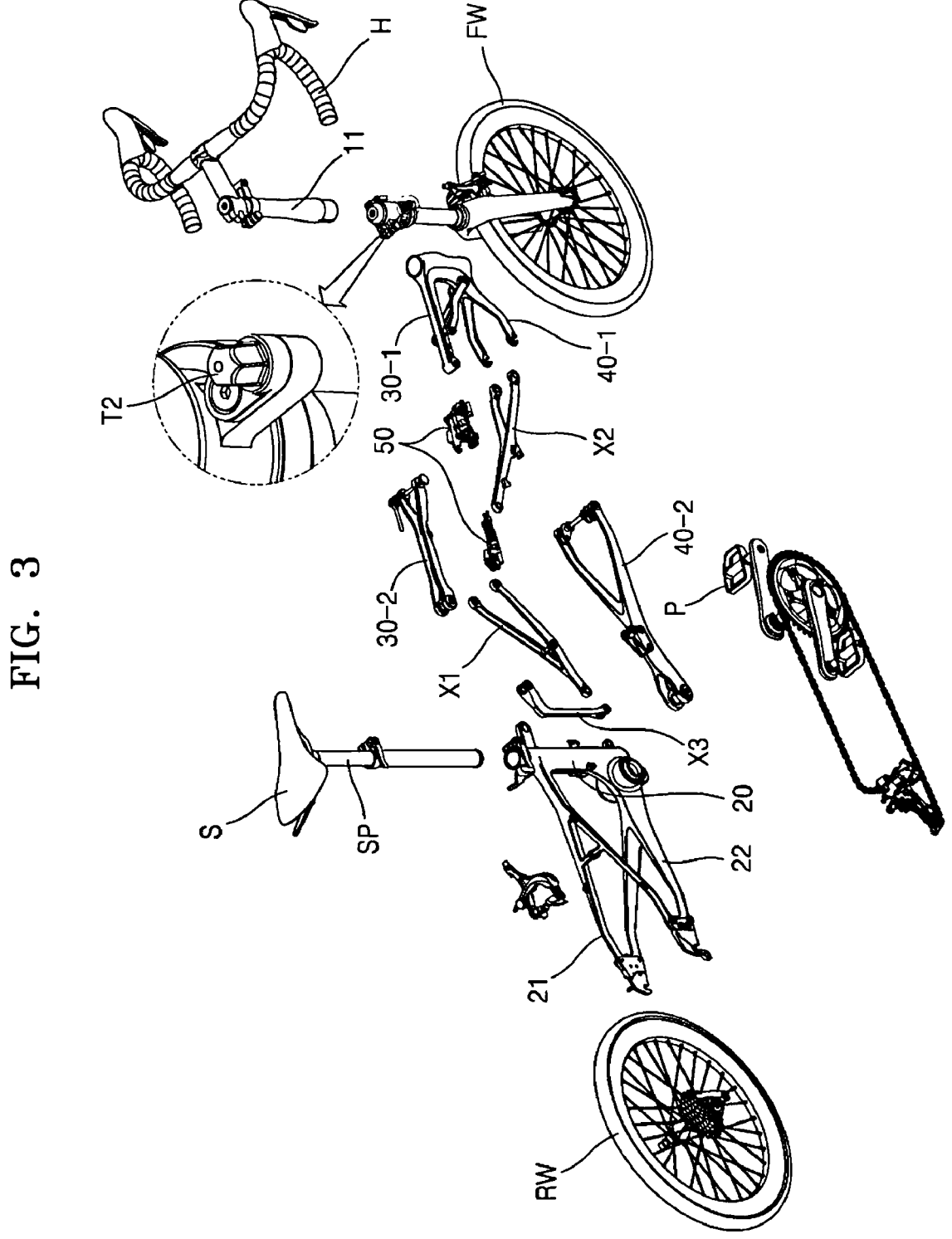
FIG. 3 is an exploded perspective view illustrating parts of the separable bicycle of FIG. 1.
Figure 4:
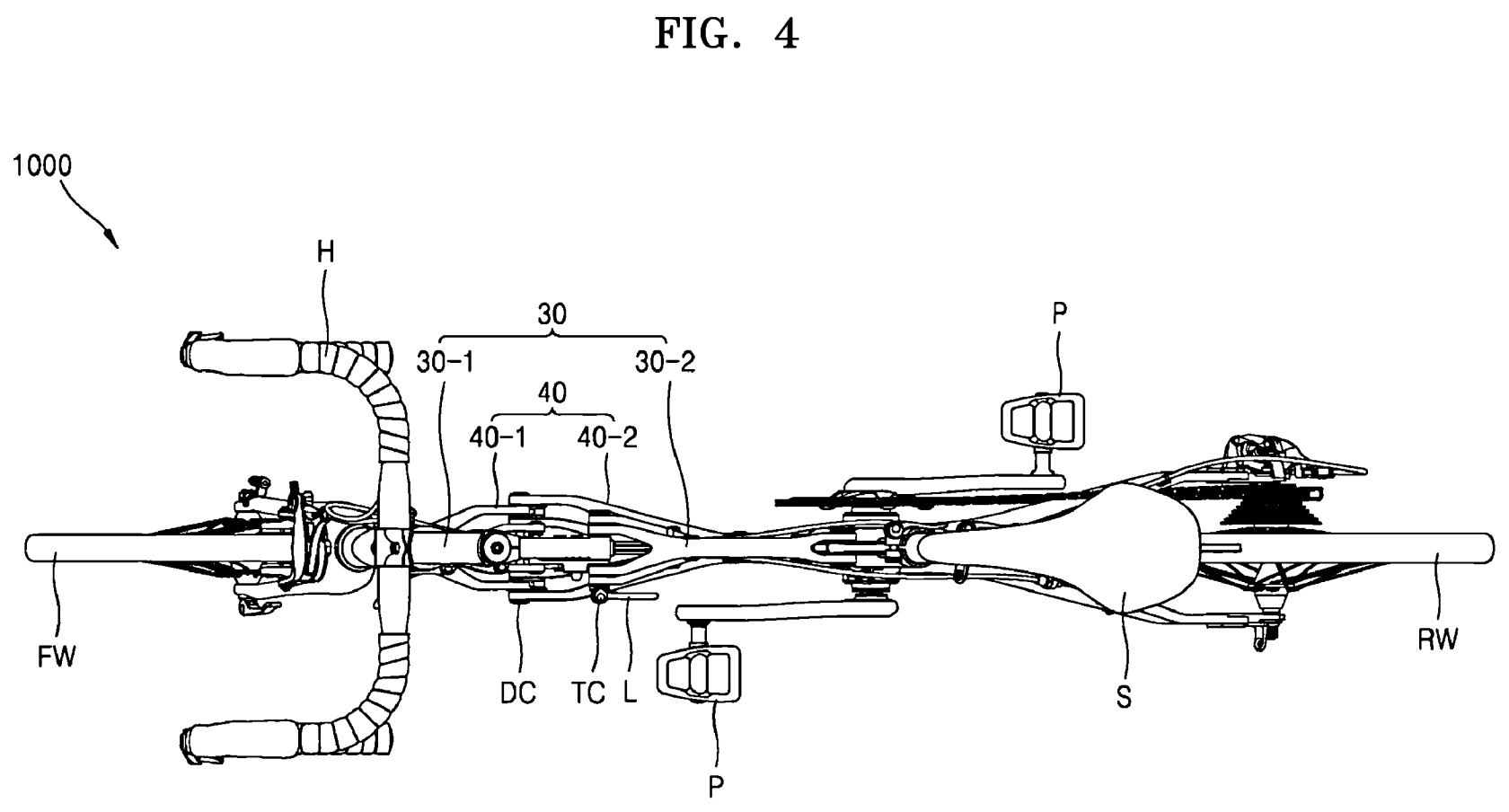
Figure 5:
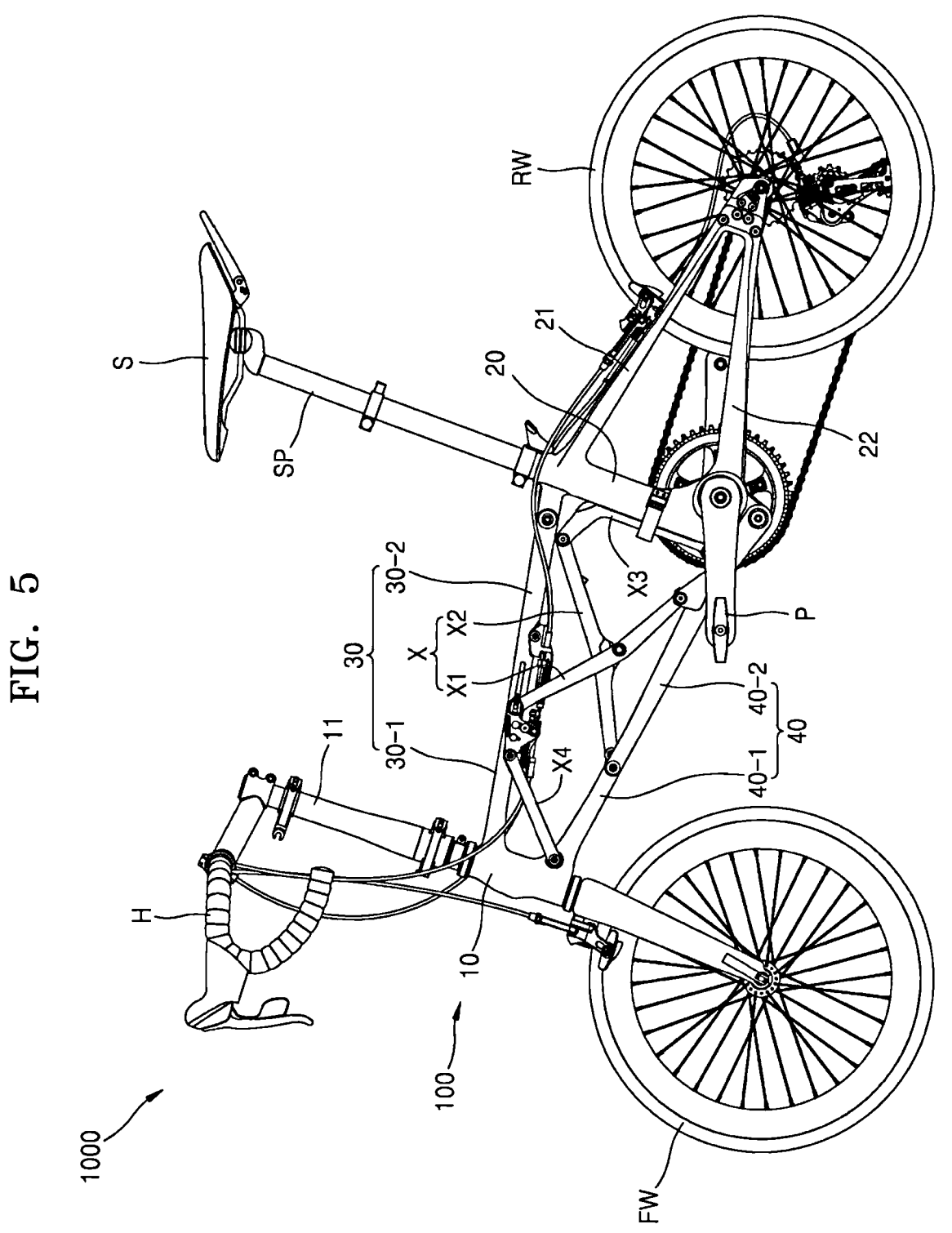
FIG. 5 is a side view illustrating the separable bicycle of FIG. 1.

FIG. 2 is an enlarged external perspective view illustrating the separable bicycle 1000 of FIG. 1, FIG. 3 is an exploded perspective view illustrating parts of the separable bicycle 1000 of FIG. 1, FIG. 4 is a plan view illustrating the separable bicycle 1000 of FIG. 1, and FIG. 5 is a side view illustrating the separable bicycle 1000 of FIG. 1.

More specifically, for example, as shown in FIGS. 1 to 5, the top frame 30 may include a front top bar 30-1 and a rear top bar 30-2. The front top bar 30-1 has one end connected to an upper portion of the head tube 10 and the other end in which a C-shaped groove G1 of FIG. 10, which is a type of a first coupling portion, is formed so that the other end is to be fastened by the top fastening portion TC. The rear top bar 30-2 has one end connected to an upper portion of the seat tube 20 and the other end in which the top fastening portion TC having a first fastening shaft J1 fastened to the C-shaped groove G1 and a fastening lever L capable of pressing the first fastening shaft J1 is formed.

Also, for example, as shown in FIGS. 1 to 5, the down frame 40 may include a front down bar 40-1 and a rear down bar 40-2. The front down bar 40-1 has one end connected to a lower portion of the head tube 10 and the other end in which an inverted U-shaped groove G2 of FIG. 10, which is a type of a second coupling portion, is formed so that the other end is to be fastened by the down fastening portion DC. The rear down bar 40-2 has one end connected to a lower portion of the seat tube 20 and the other end in which the down fastening portion DC having a second fastening shaft J2 fastened to the inverted U-shaped groove G2 is formed.

Here, the first coupling portion and the second coupling portion are not necessarily limited to the C-shaped groove G1 and the inverted U-shaped groove G2, and a wide variety of coupling portions, such as grooves or holes, may be applied.

As shown in FIGS. 2 to 5, the separable bicycle 1000 according to some embodiments of the present disclosure may further include a reinforcing bar X formed in an X-shape or a diagonal shape as a whole between the rear top bar 30-2 and the rear down bar 40-2 to reinforce the strength and durability of the rear top bar 30-2 and the rear down bar 40-2.

More specifically, for example, as shown in FIGS. 2 to 5, the reinforcing bar X may include a first branch bar X1 and a second branch bar X2. The first branch bar X1 connects the front of the rear top bar 30-2 to the rear of the rear down bar 40-2 or the lower side of the seat tube 20, and is branched in a Y-shape. The second branch bar X2 connects the front of the rear down bar 40-2 to the upper side of the seat tube

20 or the rear of the rear top bar 30-2, is branched in a Y-shape, and passes through a branching space of the first branch bar X1 to be supported in an X-shape as a whole together with the first branch bar X1.

Accordingly, strength and durability may be greatly increased by crossing the first branch bar X1 and the second branch bar X2 with each other, and in particular, each bar may be branched in a Y shape like the Y-shaped skeleton of a fish, and thus may structurally maximize strength versus weight (or volume) and may minimize air resistance during high-speed driving.

Figure 6:
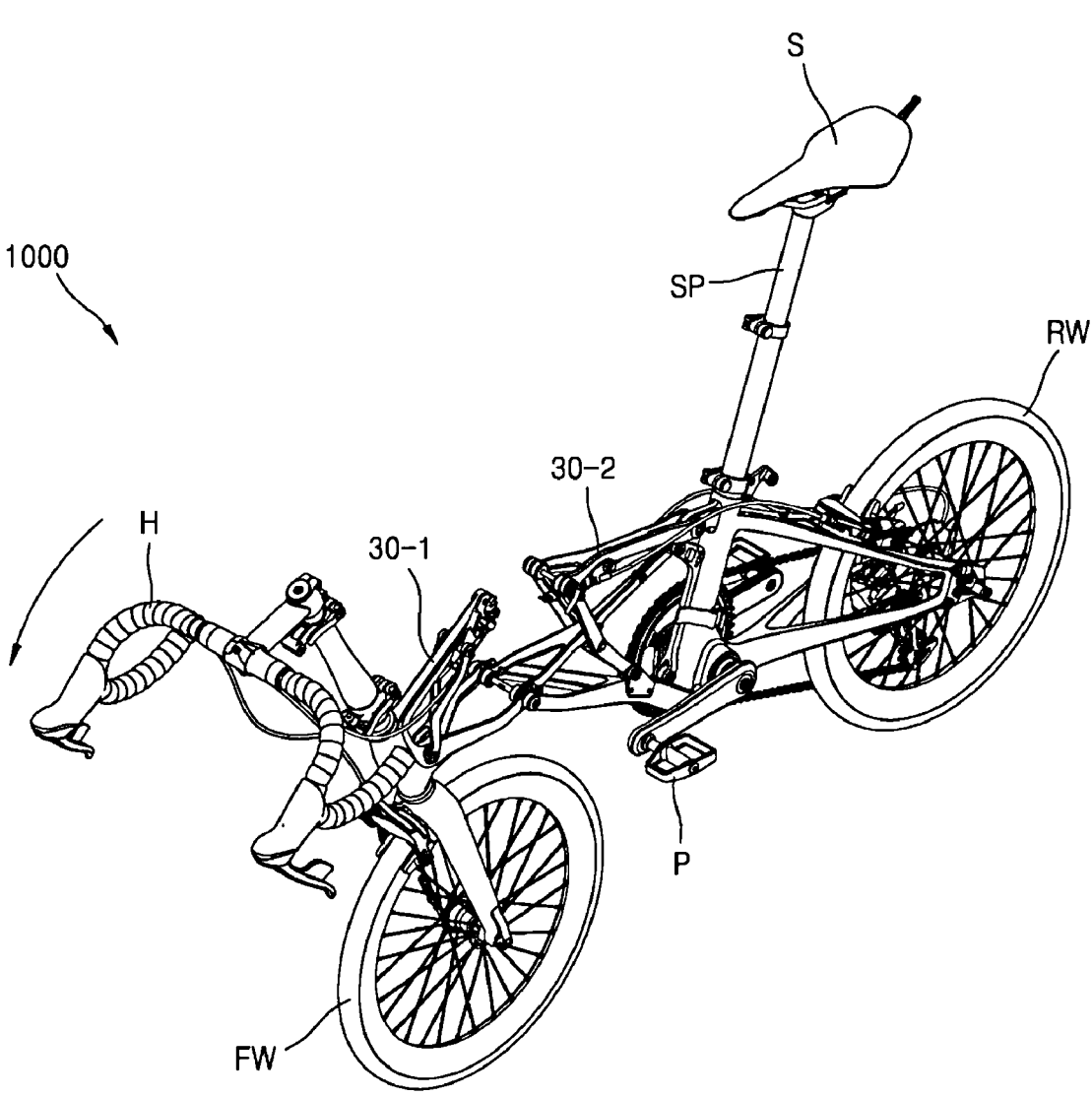
FIG. 6 is a perspective view illustrating a first-stage separation state of the separable bicycle of FIG. 1.
Figure 7:
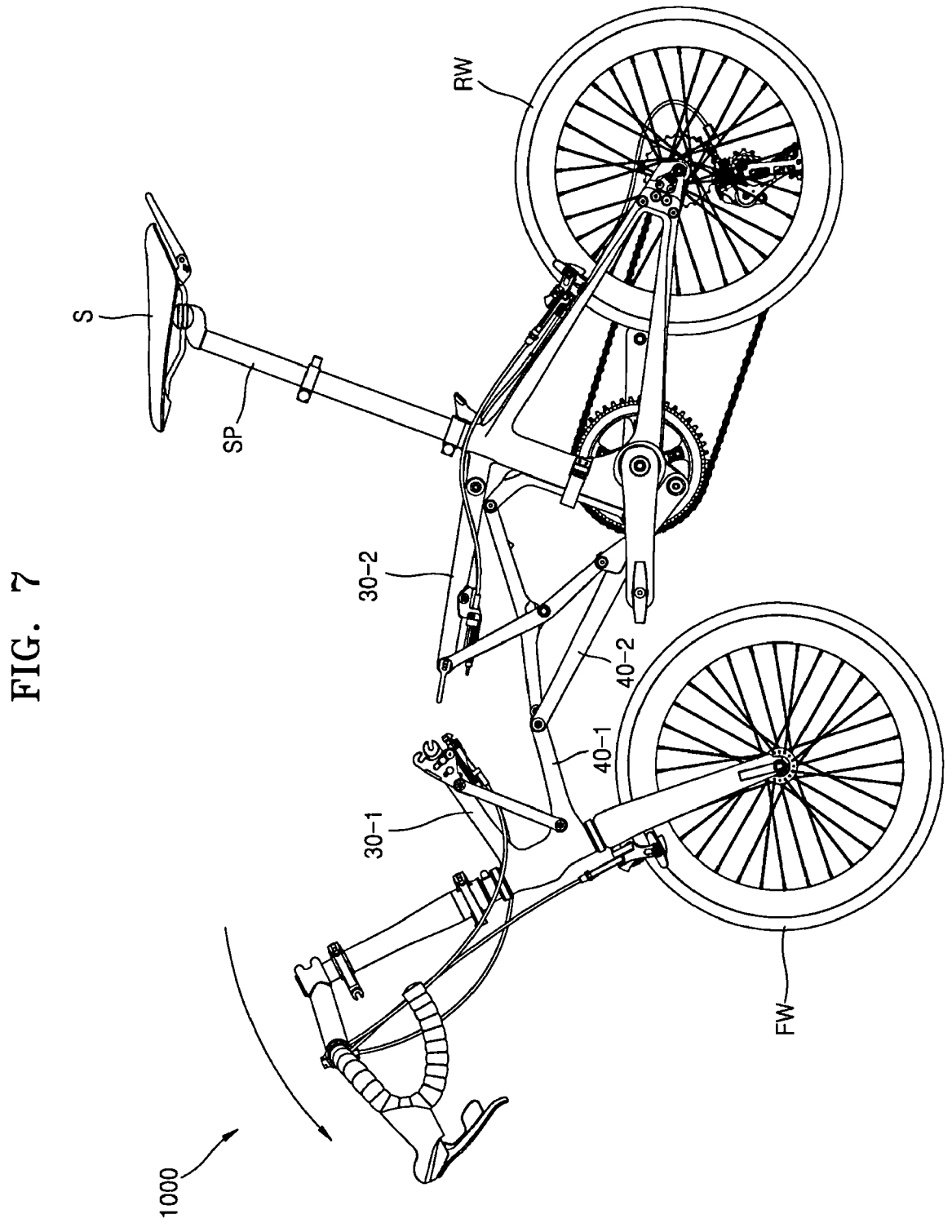
FIG. 7 is a side view illustrating the separable bicycle of FIG. 6.
Figure 8:
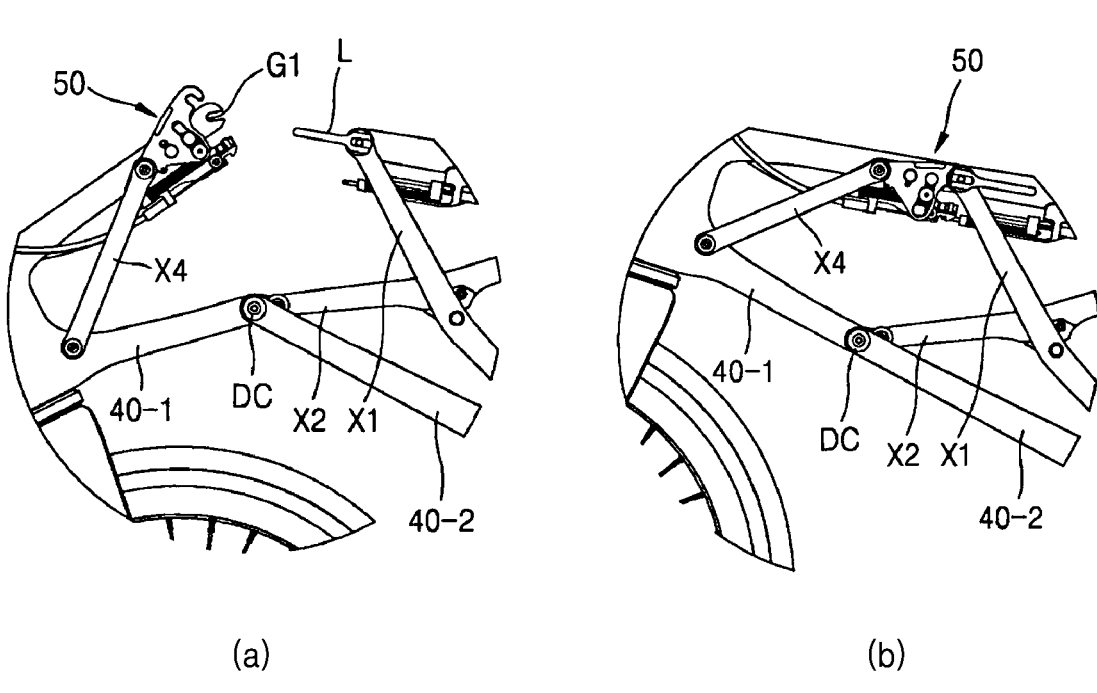
FIG. 8 is side views illustrating, in stages, a first-stage separation state of the separable bicycle of FIG. 6.
Figure 9:
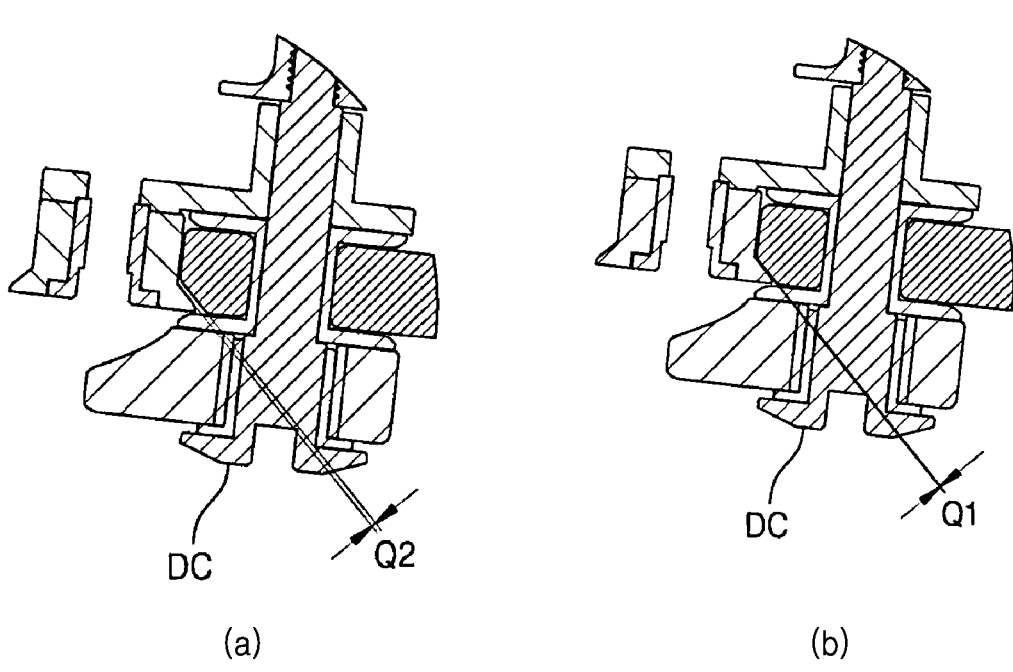
FIG. 9 is cross-sectional views illustrating a cross-section of a down fastening portion of the separable bicycle of FIG. 8.

FIG. 6 is a perspective view illustrating a first-stage separation state of the separable bicycle 1000 of FIG. 1, FIG. 7 is a side view illustrating the separable bicycle 1000 of FIG. 6, FIGS. 8A and 8B are side views illustrating, in stages, a first-stage separation state of the separable bicycle 1000 of FIG. 6, and FIGS. 9A and 9B are cross-sectional views illustrating a cross-section of a down fastening portion of the separable bicycle 1000 of FIGS. 8A and 8B.

Referring to FIGS. 6 to 9, the separable bicycle 1000 according to some embodiments of the present disclosure may further include a wire separation device 50 that is installed on the top frame 30 or the down frame 40 and is capable of completely separating various wires into a front wire W1 and a rear wire W2.

Therefore, as shown in FIGS. 8A and 8B, first, the fastening lever L of the top fastening portion TC may be rotated and released (see FIG. 8A), the wire separation device 50 may be separated, and then the front top bar 30-1 of the top frame 30 may be separated from the rear top bar 30-2.

In this case, as shown in FIG. 9B, before the front top bar 30-1 is separated from the rear top bar 30-2, the front top bar 30-1 and the rear top bar 30-2 are firmly assembled so that there is almost no gap like a first gap Q1, and thus, the front down bar 40-1 is firmly fixed. However, as shown in FIG. 9A, once the front top bar 30-1 is separated from the rear top bar 30-2 and rotated upward, the first gap Q1 may widen in a rotary cap manner to a second gap Q2 and the front down bar 40-1 may also be completely separated together with the front top bar 30-1. Similarly, when assembling in reverse, the front top bar 30-1 and the front down bar 40-1 easily enter the fastening shafts described above and are rotated and tightened, and thus may be fixed more firmly. Here, the present disclosure is not necessarily limited only to the drawings, and a wide variety of grooves, holes, and rotary cam devices may all be applied.

Therefore, even when the fastening lever L is released, it is difficult for the rear top bar 30-2 to rotate upward because the force is applied downward by a user's weight, and therefore, the separable bicycle 1000 has a very safe structure in which the front top bar 30-1 never separates from the rear top bar 30-2 when a user rides the separable bicycle 1000.

Figure 17A:
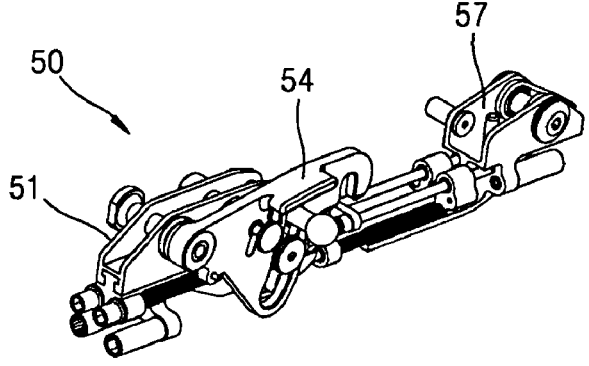
FIG. 17 is an external perspective view and an exploded perspective view, respectively, illustrating a wire separation device of the bicycle of FIG. 1.
Figure 17B:
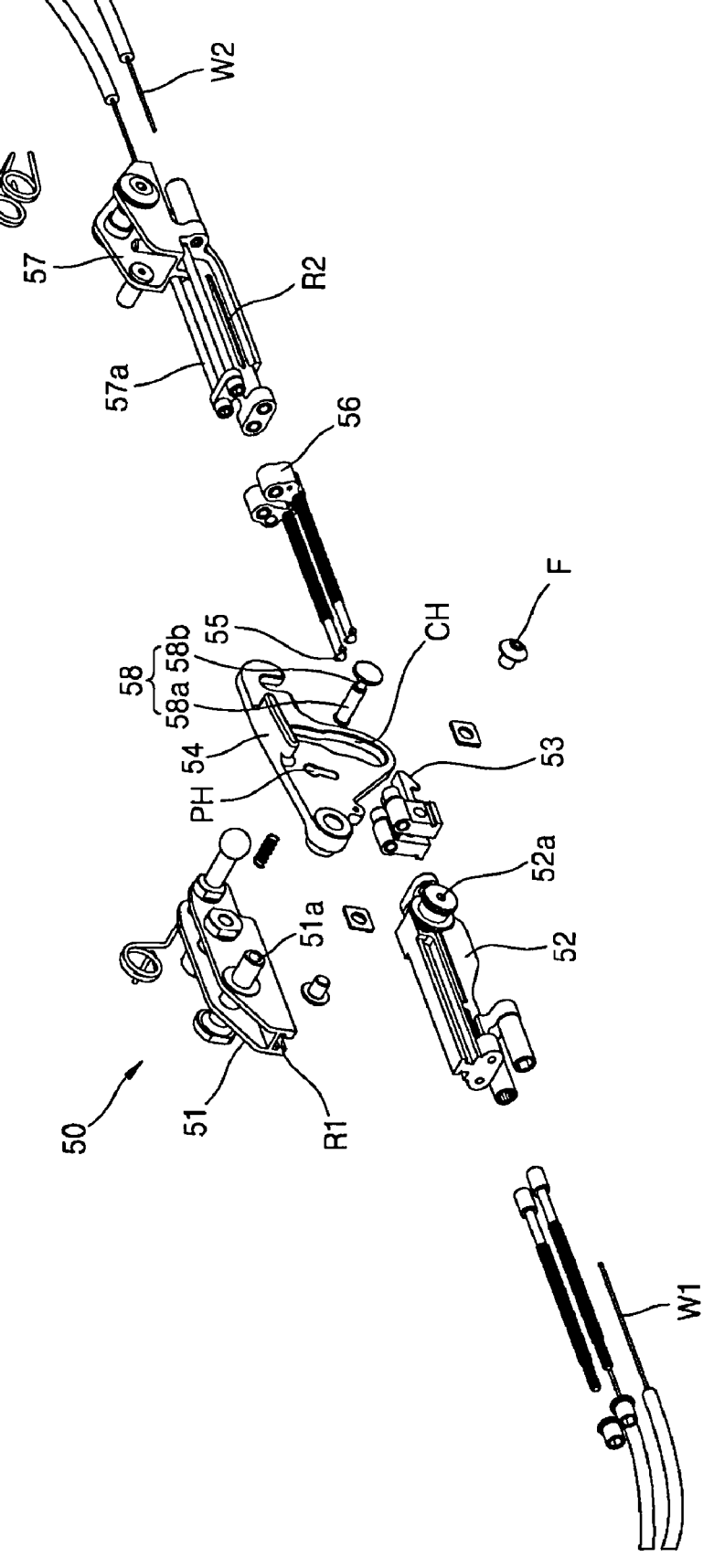

FIGS. 17A and 17B are an external perspective view and an exploded perspective view, respectively, illustrating the wire separation device 50 of the separable bicycle 1000 of FIG. 1.

More specifically, for example, as shown in the external perspective view of FIG. 17A and the exploded perspective view of FIG. 17B, the wire separation device 50 may include a front fixing portion 51, a front movable portion 52, a tip protrusion 53, a rotation cam plate 54, a clasp 55, a rear movable portion 56, a rear fixing portion 57, and a safety pressing pin 58. The front fixing portion 51 is installed on the front top bar 30-1 and a guide rail R1 is formed on one side of the front fixing portion 51. The front movable portion 52 is formed to be movable forward and backward along the guide rail R1 of the front fixing portion 51, and a restraining protrusion 52*a* is formed on one side of the front movable portion 52. The tip protrusion 53 is installed on the front movable portion 52, and the front wire W1 is fixed to the tip protrusion 53 with a fixing screw F. The rotation cam plate 54 is rotatably linked to a link shaft 51*a* of the front fixing portion 51, and an arc-shaped cam hole CH for constraining and guiding the restraining protrusion 52*a* is formed on one side of the rotation cam plate 54 so that the front movable portion 52 is temporarily moved backward during the rotation of the rotation cam plate 54 and thus the tip protrusion 53 may be in a release mode. The clasp 55 may be engaged with the tip protrusion 53 in a locking mode. The rear movable portion 56 may be moved forward and backward together with the clasp 55 in a locking mode of the clasp 55, and a rear wire W2 is fixed to the rear movable portion 56. The rear fixing portion 57 is installed on the rear top bar 30-2 and has a guide rod 57*a* or a guide rail R2 that may guide the forward and backward movement of the rear movable portion 56. The safety pressing pin 58 includes a body portion 58*a* formed on one side of the safety pressing pin 58 and a neck portion 58*b* formed on the other side of the safety pressing portion 58. The body portion 58*a* corresponds to a wide portion of an arc-shaped multi-width hole PH formed in the rotation cam plate 54 in normal times so that the rotation cam plate 54 may be rotated only during a pressing operation, and the neck portion 58*b* is formed on the other side of the safety pressing pin 58 so as to correspond to a narrow portion of the arc-shaped multi-width hole PH while moving backward during the pressing operation.

FIGS. 18 to 22 are perspective views illustrating, in stages, a wire separation process of the separable bicycle 1000 of FIG. 1.

Figure 18:
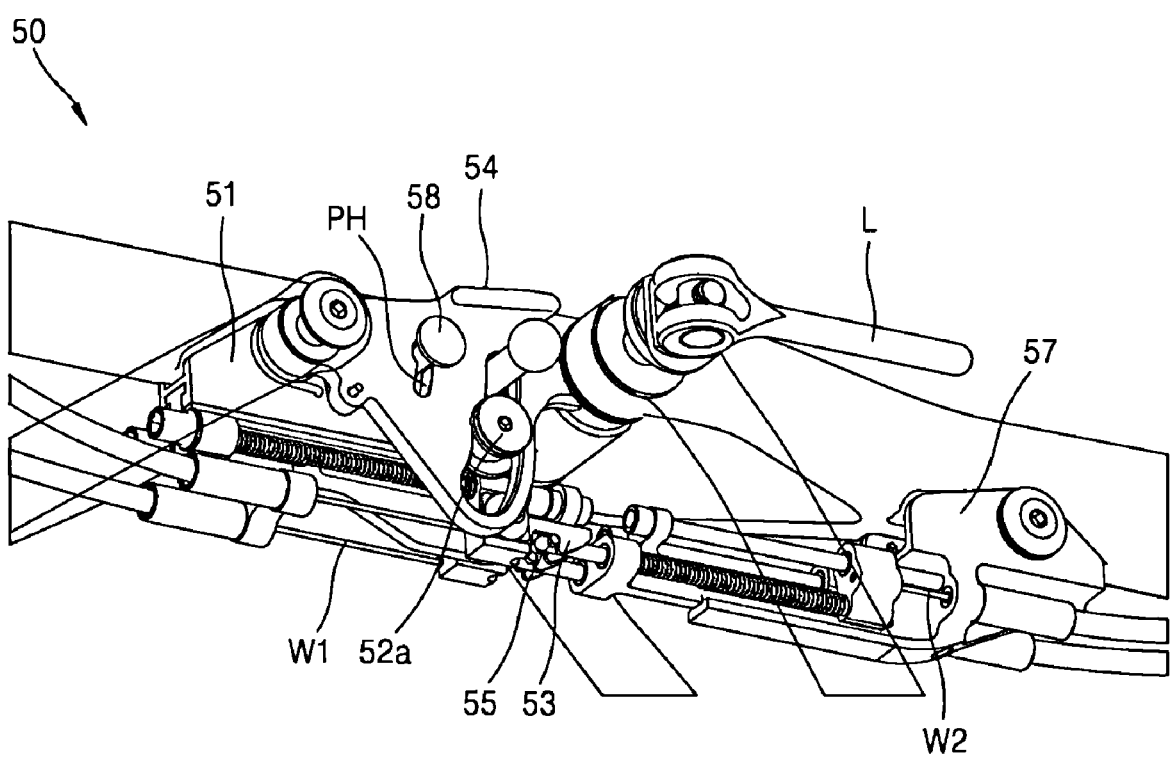
FIGS. 18 to 22 are perspective views illustrating, in stages, a wire separation process of the separable bicycle of FIG. 1.

The wire separation process of the separable bicycle 1000 of the present disclosure is described with reference to FIGS. 18 to 22. First, as shown in FIG. 18, when the fastening lever L is in a locked state, the tip protrusion 53 and the clasp 55 may be engaged with each other by a certain tension, and the tension of the front wire W1 may be intactly transferred to the rear wire W2.

Therefore, when a user pulls a brake wire or a shift wire, the wire tension thereof may be transmitted to a brake or the transmission through the front wire W1 and the rear wire W2.

Figure 19:
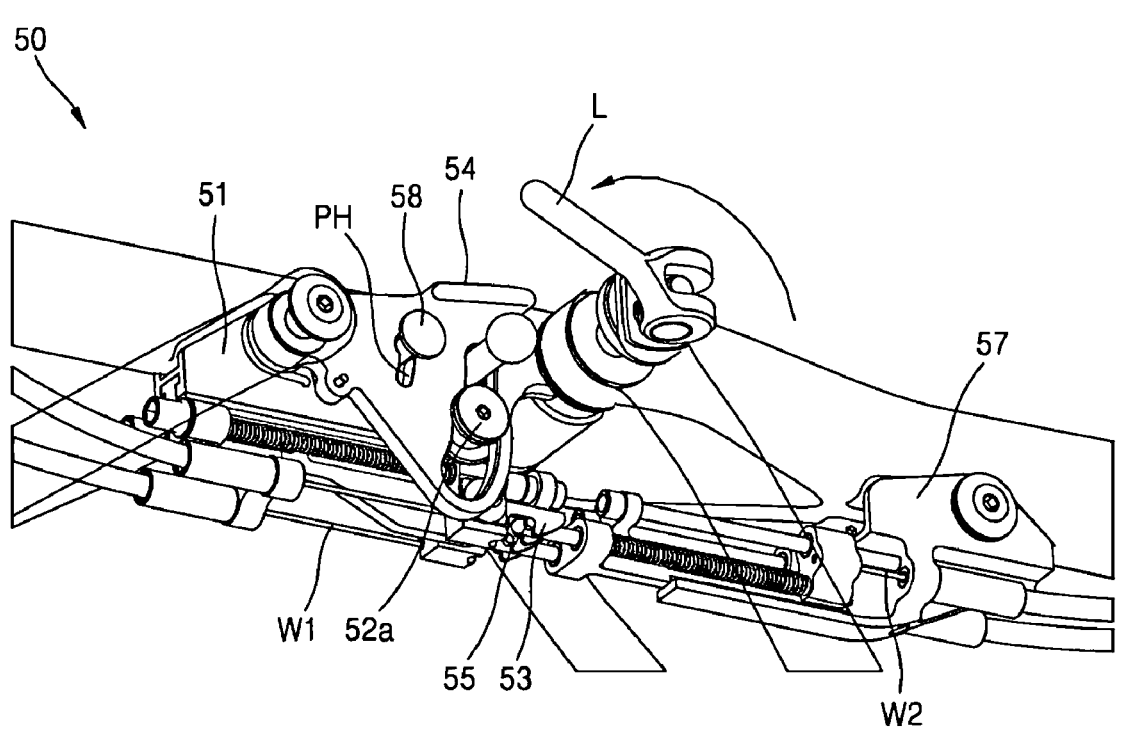

Subsequently, as shown in FIG. 19, when the fastening lever L is rotated to release the locked state, the front top bar 30-1 becomes free and may be rotated upward.

Figure 20:
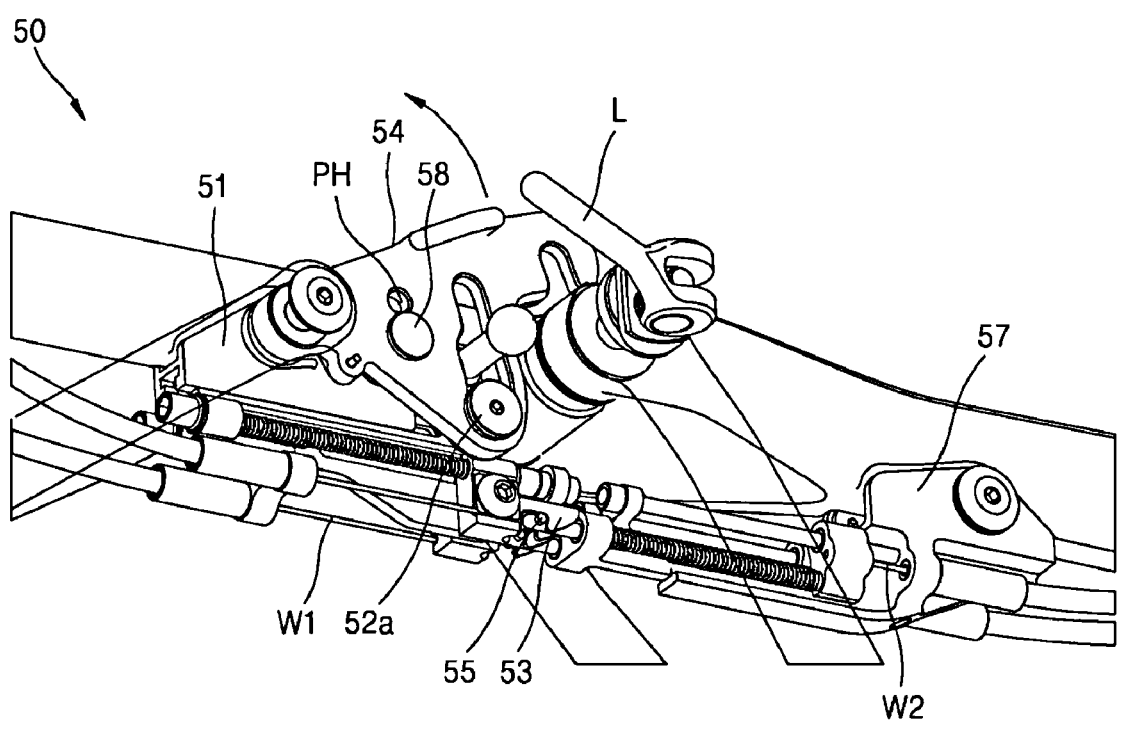

Then, as shown in FIG. 20, when the user presses the safety pressing pin 58, the neck portion 58*b* may correspond to the narrow portion of the arc-shaped multi-width hole PH while the safety pressing pin 58 overcomes the restoring force of a spring and moves backward, and the rotation cam plate 54 may be free.

Then, when the free rotation cam plate 54 is rotated, the restraining protrusion 52*a* may be guided by the arc-shaped cam hole CH and move backward, and the tip protrusion 53 may also temporarily move backward, and thus, the clasp 55 engaged by the tip protrusion 53 may be released and loosened.

Figure 21:
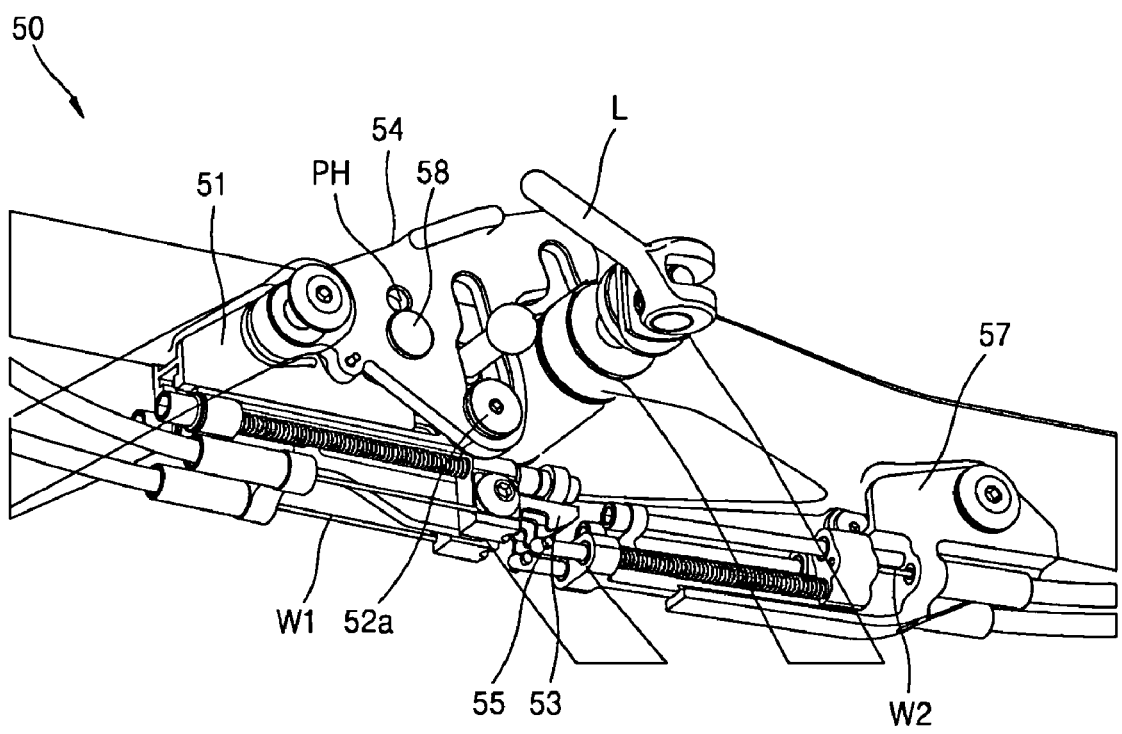
Figure 22:
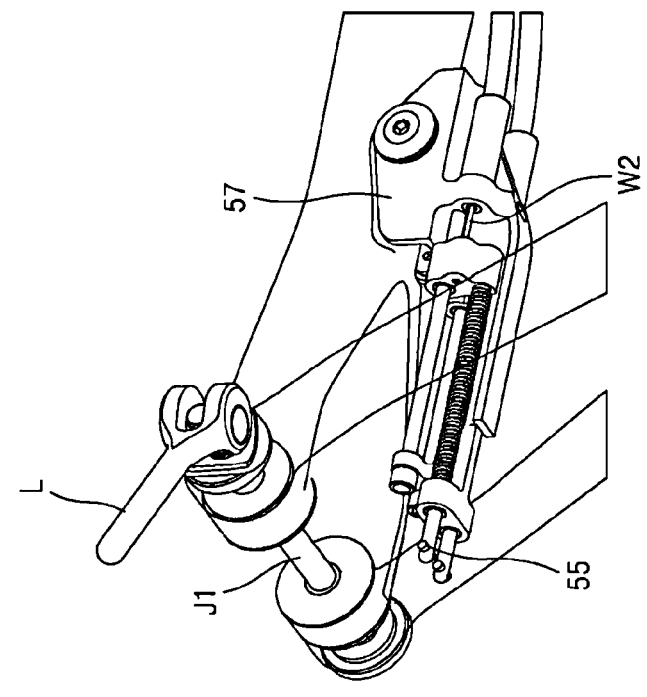
Figure 22:
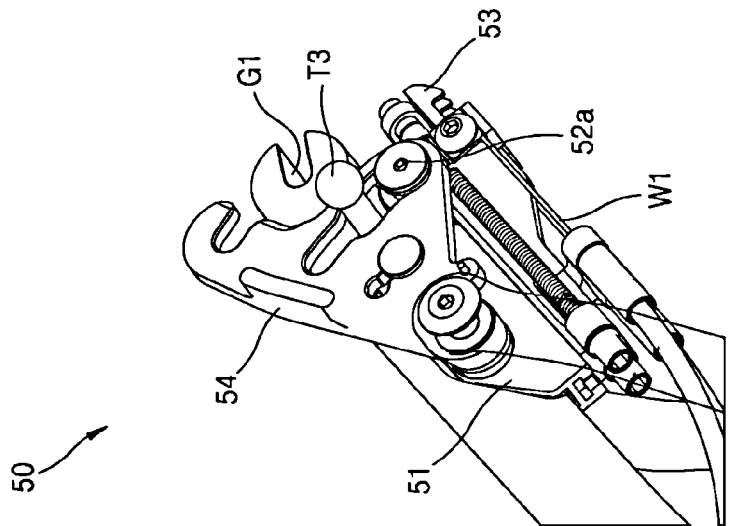

Then, when the front top bar 30-1 is rotated upward as shown in FIG. 21, the tip protrusion 53 may be completely separated from the clasp 55, as shown in FIG. 22.

On the contrary, the fastening of the tip protrusion 53 and the clasp 55 may be performed in a reverse order. A tip portion of the tip protrusion 53 may be momentarily coupled to the clasp 55 while the tip portion having an inclined surface is slid with the clasp 55. In this way, after the tip protrusion 53 and the clasp 55 are engaged with each other, when the rotation cam plate 54 is rotated in reverse, a certain tension may be formed while the tip protrusion 53 advances.

Therefore, by using the rotation cam plate 54, the tension before and after separation may be kept constant, and thus, a troublesome wire tension readjustment operation may be omitted after fastening, thereby making it very convenient to use.

Figure 10:
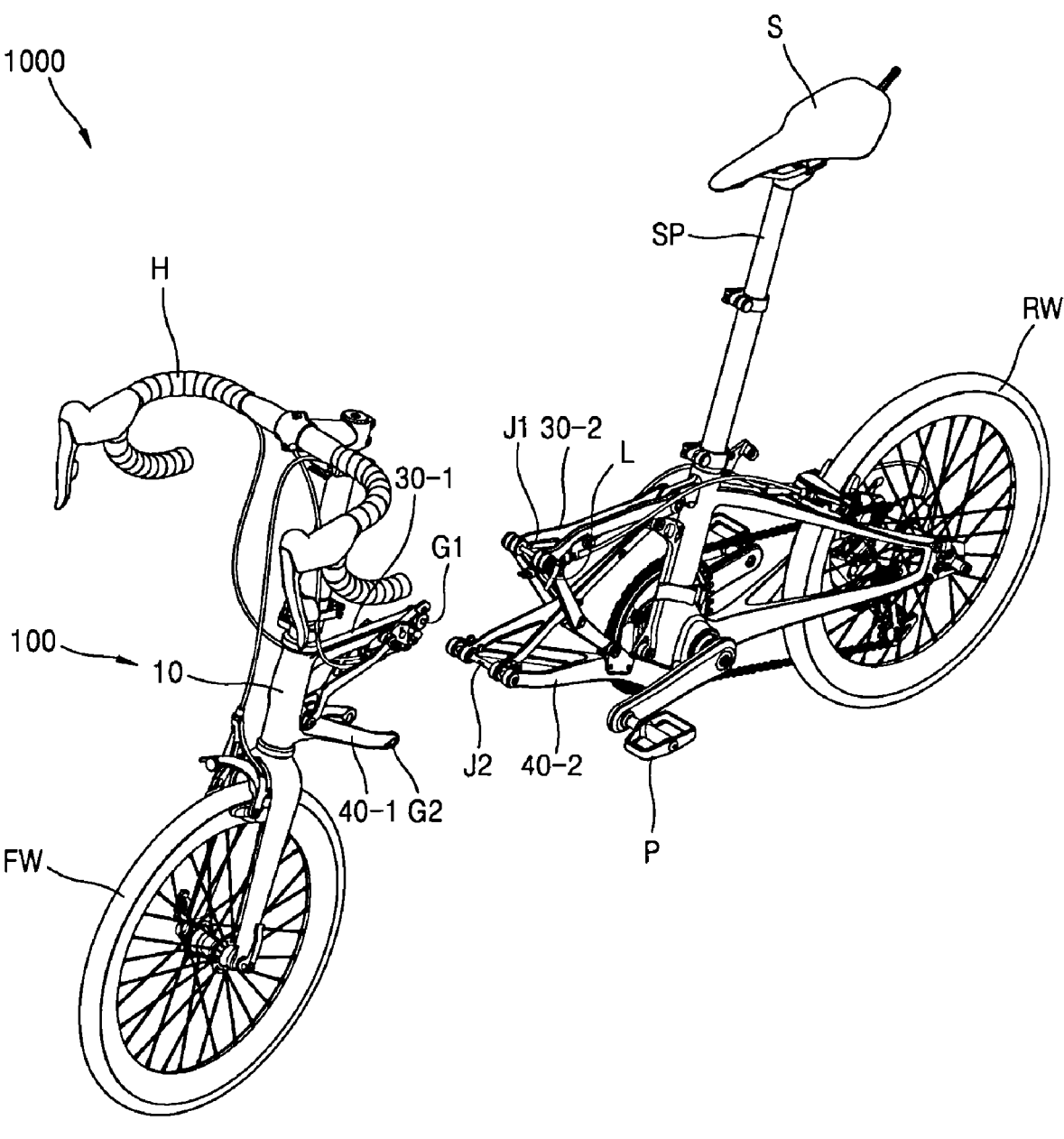
FIG. 10 is a perspective view illustrating a second-stage separation state (completely separated state) of the separable bicycle of FIG. 6.
Figure 11:
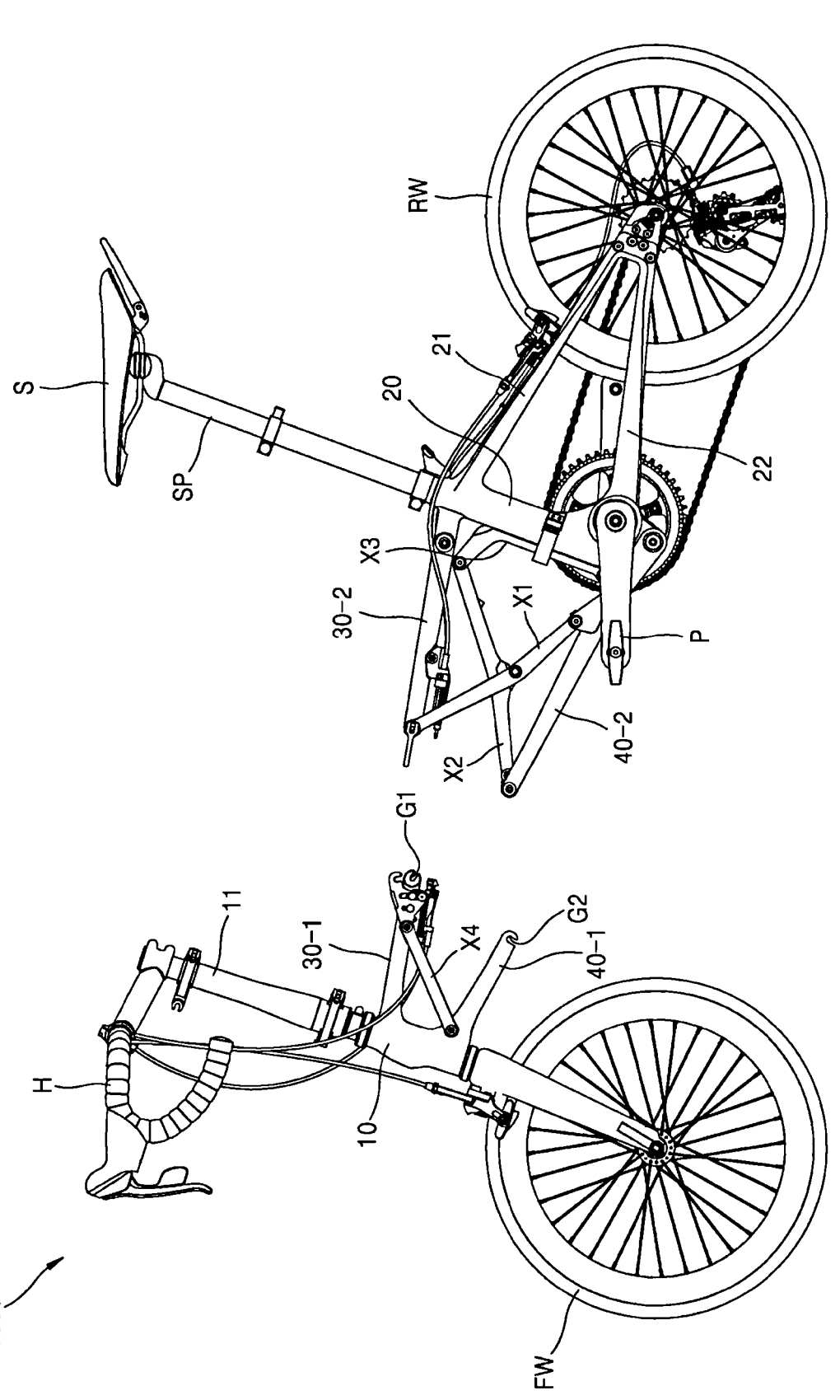
FIG. 11 is a side view illustrating the separable bicycle of FIG. 10.
Figure 12:
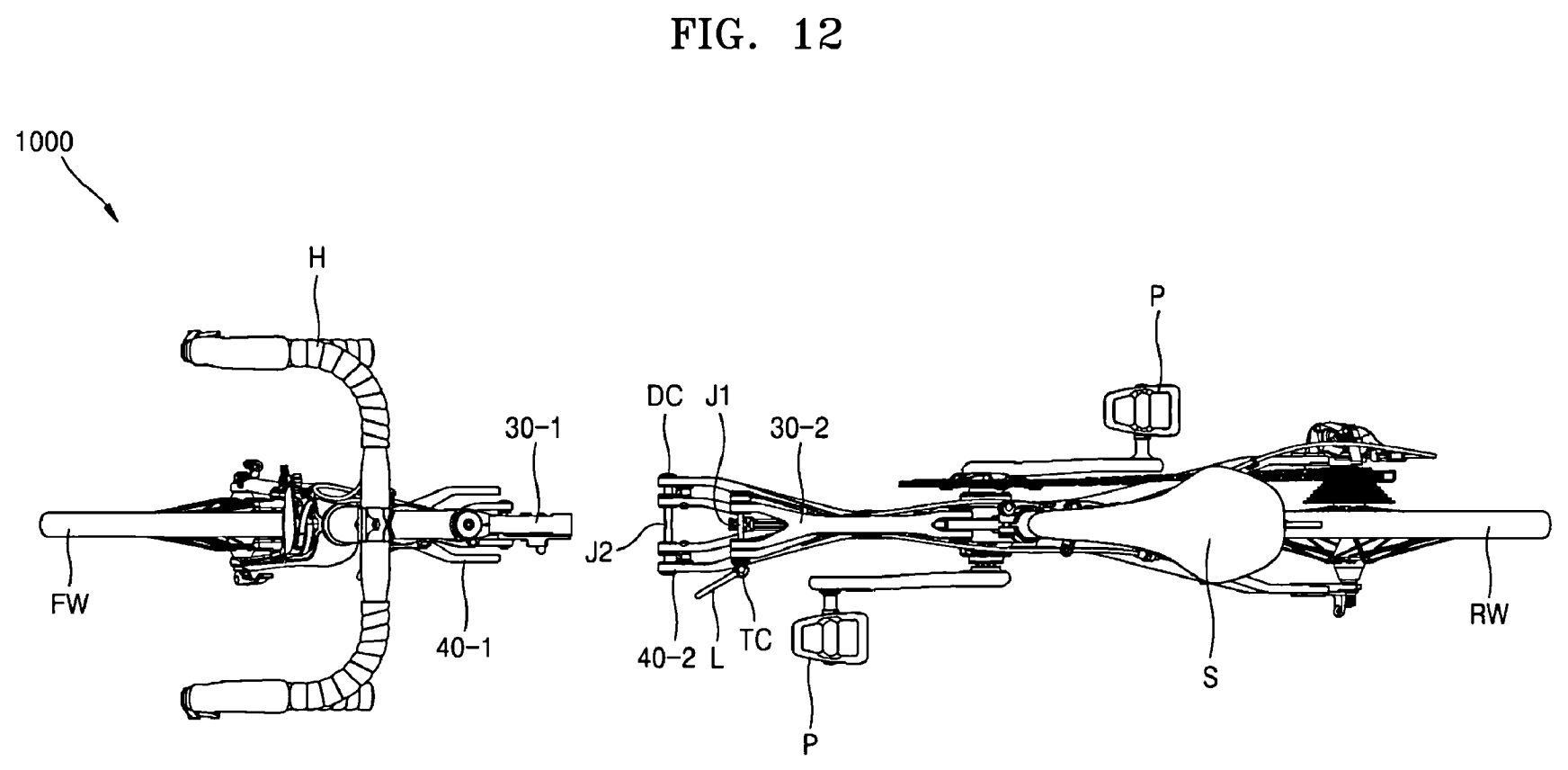

FIG. 10 is a perspective view illustrating a second-stage separation state (completely separated state) of the separable bicycle 1000 of FIG. 6, FIG. 11 is a side view illustrating the separable bicycle 1000 of FIG. 10, and FIG. 12 is a plan view illustrating the separable bicycle 1000 of FIG. 10.

Accordingly, as shown in FIGS. 10 to 12, in the separable bicycle 1000 according to some embodiments of the present disclosure, a front wheel portion, a rear wheel portion, and wires may be completely separated from each other and may be separately moved and stored. That is, for example, the front wheel portion may be stored in the trunk of a vehicle and the rear wheel portion may be stored in the remaining space of the rear seat of the vehicle. In this manner, the front wheel portion and the rear wheel portion may be moved and stored in a wide variety of forms. Therefore, space utilization is increased due to the separable type, and thus, it is possible to mount larger wheels or store them in various ways even in a narrow space.

Here, the top frame 30 may include a front top bar 30-1 and a rear top bar 30-2. The front top bar 30-1 has one end connected to an upper portion of the head tube 10 and the other end in which the C-shaped groove G1 of FIG. 10 is formed so that the other end is to be fastened by the top fastening portion TC. The rear top bar 30-2 has one end connected to an upper portion of the seat tube 20 and the other end in which the top fastening portion TC having a first fastening shaft J1 fastened to the C-shaped groove G1 and a fastening lever L capable of pressing the first fastening shaft J1 is formed. The down frame 40 may include a front down bar 40-1 and a rear down bar 40-2. The front down bar 40-1 has one end connected to a lower portion of the head tube 10 and the other end in which the inverted U-shaped groove G2 is formed so that the other end may be fastened by the down fastening portion DC. The rear down bar 40-2 has one end connected to a lower portion of the seat tube 20 and the other end in which the down fastening portion DC having a second fastening shaft J2 fastened to the inverted U-shaped groove G2 is formed.

Figure 13:
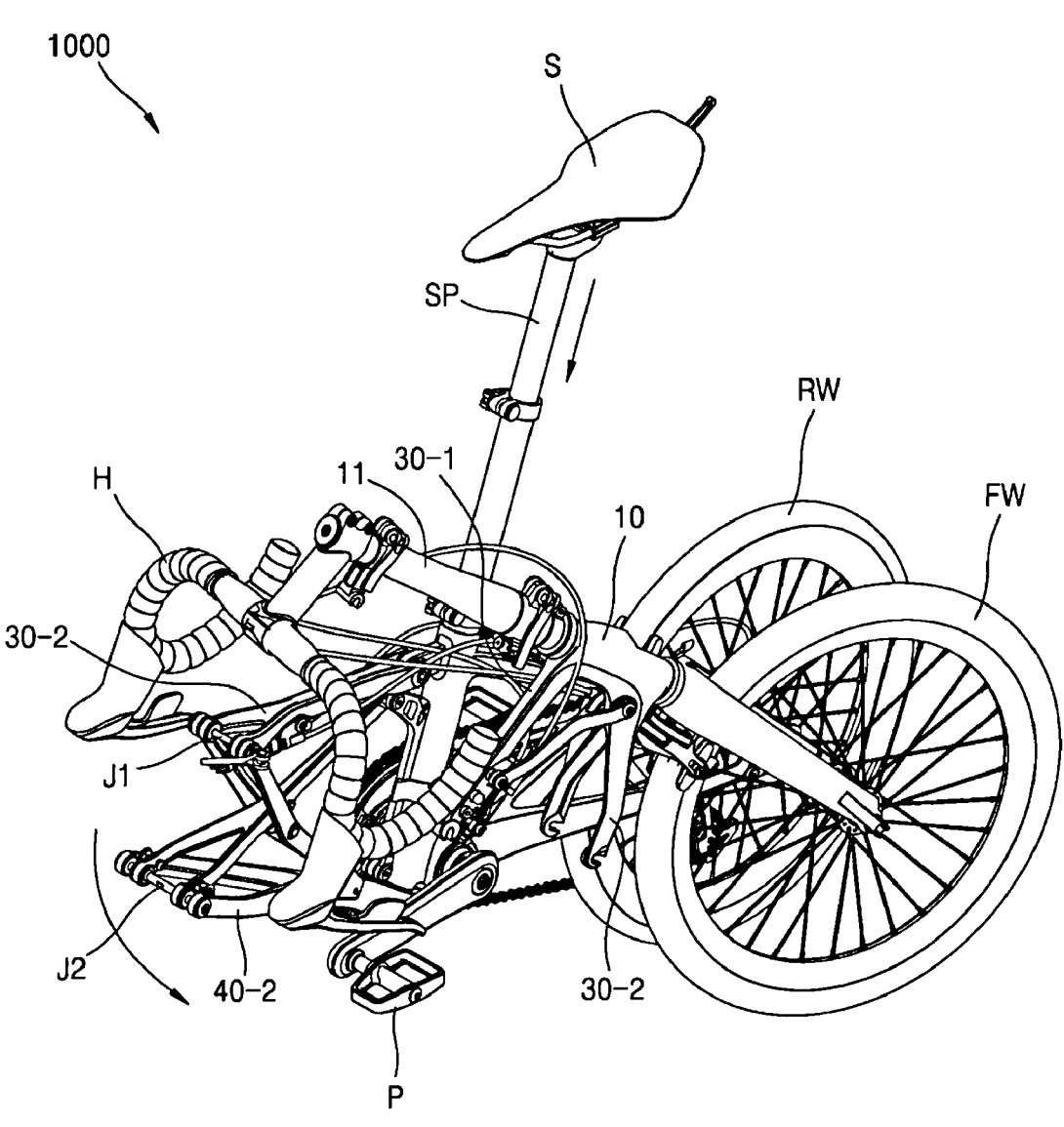
FIG. 13 is a perspective view illustrating a third-stage separation state (wheel overlapping state) of the separable bicycle of FIG. 10.

FIG. 13 is a perspective view illustrating a third-stage separation state (wheel overlapping state) of the separable bicycle 1000 of FIG. 10.

Subsequently, as shown in FIG. 13, in the separable bicycle 1000 according to some embodiments of the present disclosure, the front wheel FW and the rear wheel RW separated from each other in a third stage may overlap each other.

Figure 14:
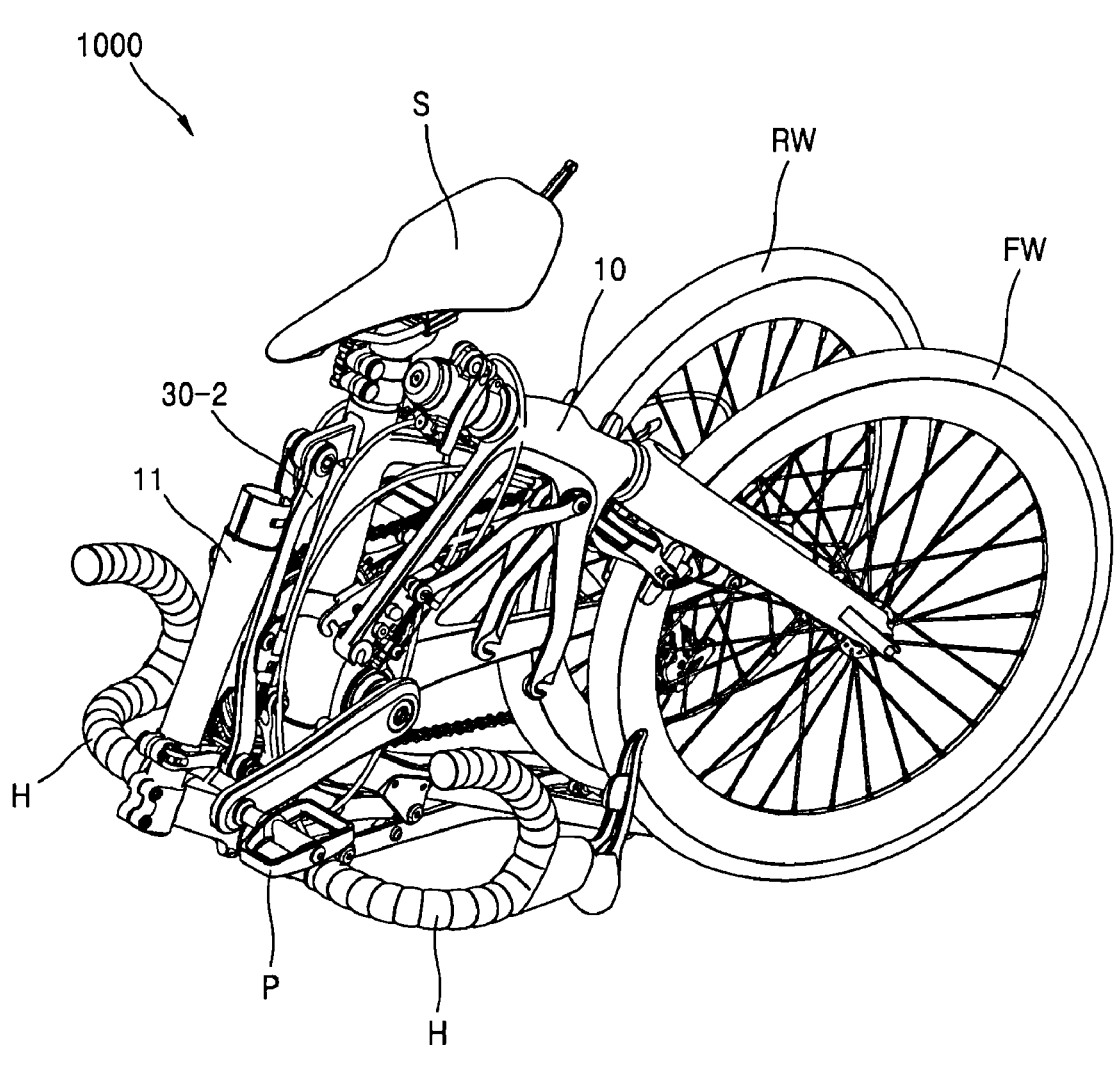
FIG. 14 is a perspective view illustrating a fourth-stage storage state (handle fixing state) of the separable bicycle of FIG. 13.
Figure 23:
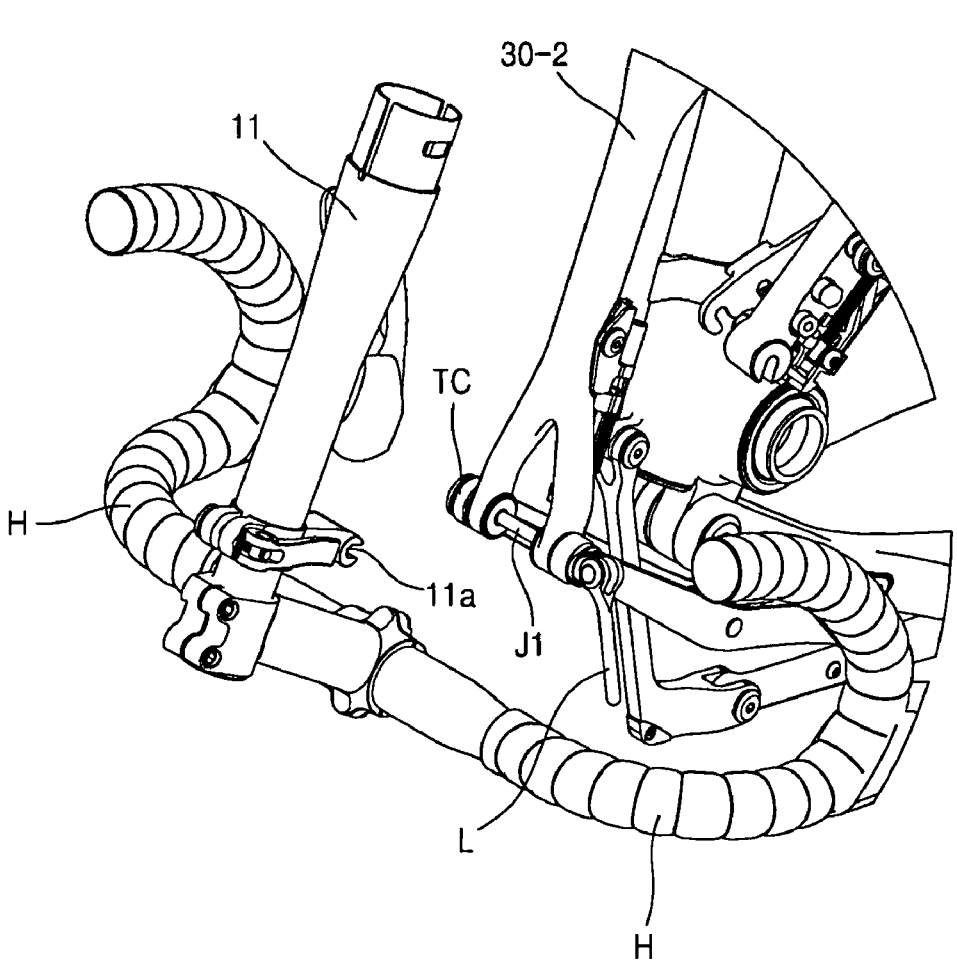
FIG. 23 is a perspective view illustrating a handle fixing process of the separable bicycle of FIG. 14.

FIG. 14 is a perspective view illustrating a fourth-stage storage state (handle fixing state) of the separable bicycle 1000 of FIG. 13, and FIG. 23 is a perspective view illustrating a handle fixing process of the separable bicycle 1000 of FIG. 14.

Subsequently, as shown in FIGS. 14 and 23, in the separable bicycle 1000 according to some embodiments of the present disclosure, the separable bicycle frame 100 may be folded from an extended state to a folded state in a fourth stage, and then the handle stem 11 may be separated from the head tube 10 and be turned over so that the handle H faces downward, and may be fastened to the first fastening shaft J1 of the rear top bar 30-2 by using the fastening lever L.

In this case, as shown in FIG. 23, a C-shaped stem groove 11a may be formed on one side of the handle stem 11 so that the head tube 10 is capable of being temporarily fixed.

Figure 15:
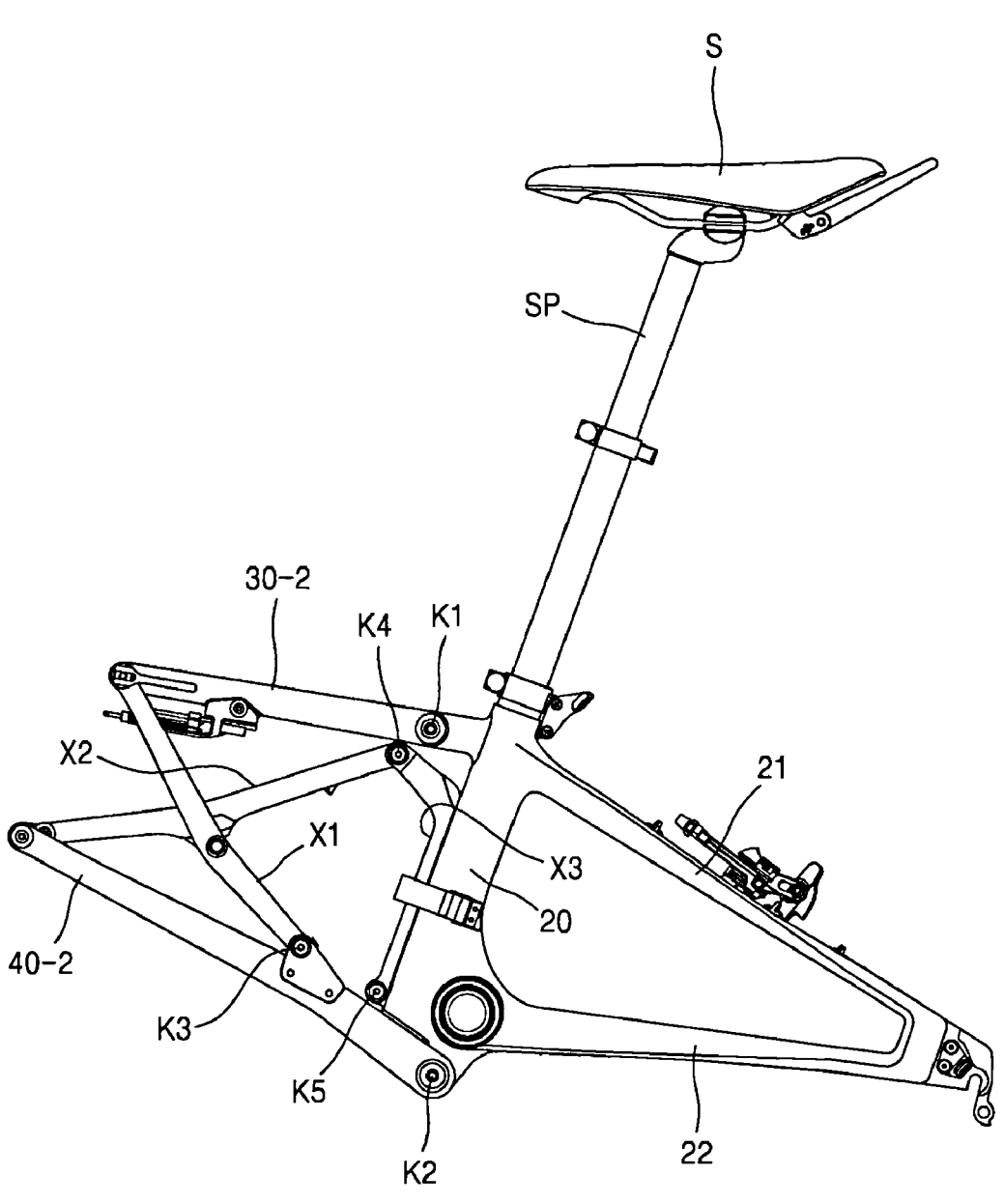
FIG. 15 is a side view illustrating an extended state of the separable bicycle frame of FIG. 13.
Figure 16:
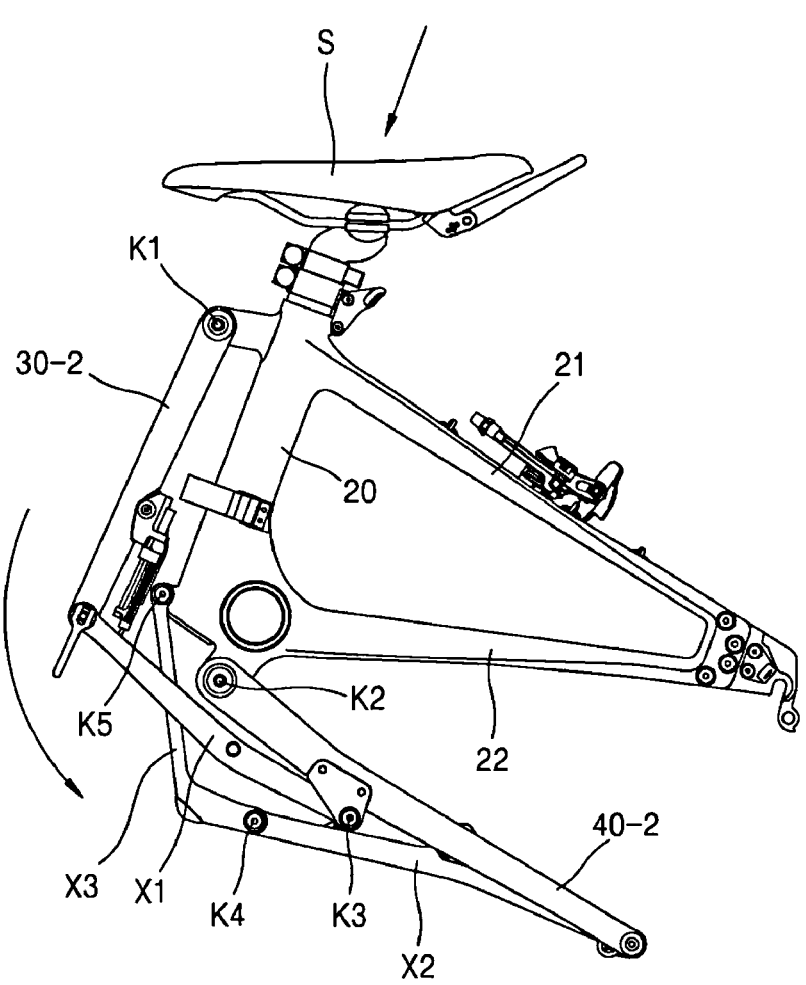
FIG. 16 is a side view illustrating a folded state of the separable bicycle frame of FIG. 13.

FIG. 15 is a side view illustrating an extended state of the separable bicycle frame 100 of FIG. 13, and FIG. 16 is a side view illustrating a folded state of the separable bicycle frame 100 of FIG. 13.

First, as shown in FIG. 15, in the separable bicycle frame 100 according to some embodiments of the present disclosure, the reinforcing bar X may further include a third foldable bar X3, which is linked between the seat tube 20 and the second branch bar X3 and foldable, so that the rear top bar 30-2, the rear down bar 40-2, the first branch bar X1, and the second branch bar X2 may be folded from top to bottom to reduce space. In addition, the reinforcing bar X may further include a fourth reinforcing bar X4 branched between the front top bar 30-2 and the head tube 10 in order to reinforce strength or durability.

In addition, as shown in FIG. 15, so as to be foldable downward to reduce space during storage, a first joint portion K1 may be formed at the rear of the rear top bar 30-2, a second joint portion K2 may be formed at the rear of the rear down bar 40-2, a third joint portion K3 may be formed at the rear of the first branch bar X1, a fourth joint portion K4 may be formed at the rear of the second branch bar X2, and a fifth joint portion K5 may be formed at the rear of the third foldable bar X3.

Accordingly, as shown in FIG. 16, when the rear top bar 30-2 is folded downward, the rear down bar 40-2, the first branch bar X1, the second branch bar X2, and the third foldable bar X3 may be interlocked to be folded downward.

Here, the third foldable bar X3 interferes with the seat tube 20, and a force acts in a direction in which the rear down bar 40-1 presses the lower side of the seat tube 20 due to a user's weight when riding and thus the third foldable bar X3 is not foldable in a reverse direction. Therefore, the separable bicycle 1000 may be safely used.

Figure 24A:
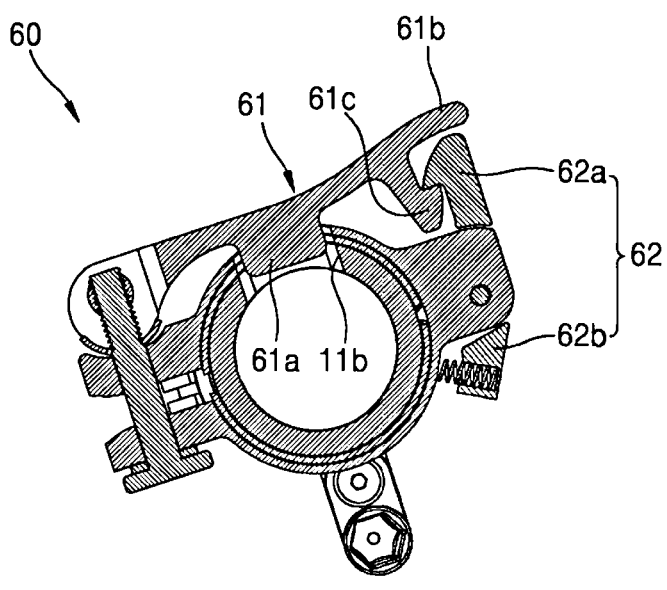
FIG. 24 is a cross-sectional view, a first perspective view, and a second perspective view, respectively, illustrating a handle stem fixing device of the separable bicycle of FIG. 1.
Figure 24B:
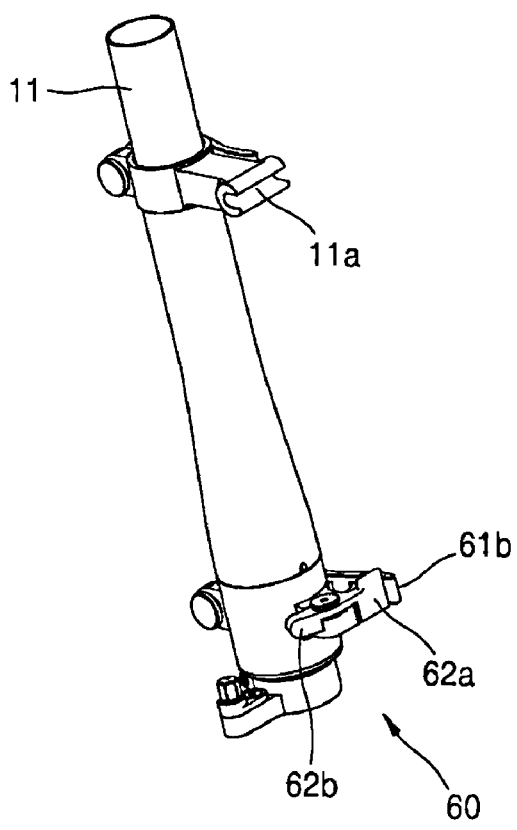
Figure 24C:
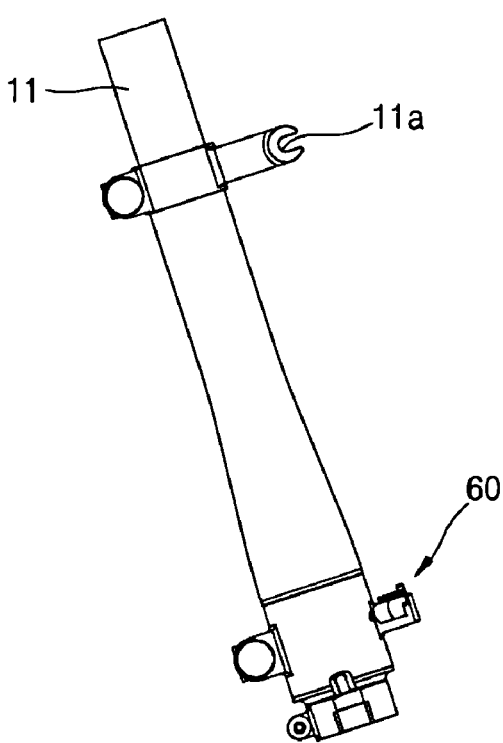

FIGS. 24A to 24C are a cross-sectional view, a first perspective view, and a second perspective view, respectively, illustrating the handle stem fixing device 60 of the separable bicycle 1000 of FIG. 1.

As shown in FIGS. 24A to 24C, the separable bicycle 1000 according to some embodiments of the present disclosure may further include a handle stem fixing device 60 for fixing the handle stem 11 to the head tube 10.

Figure 25A:
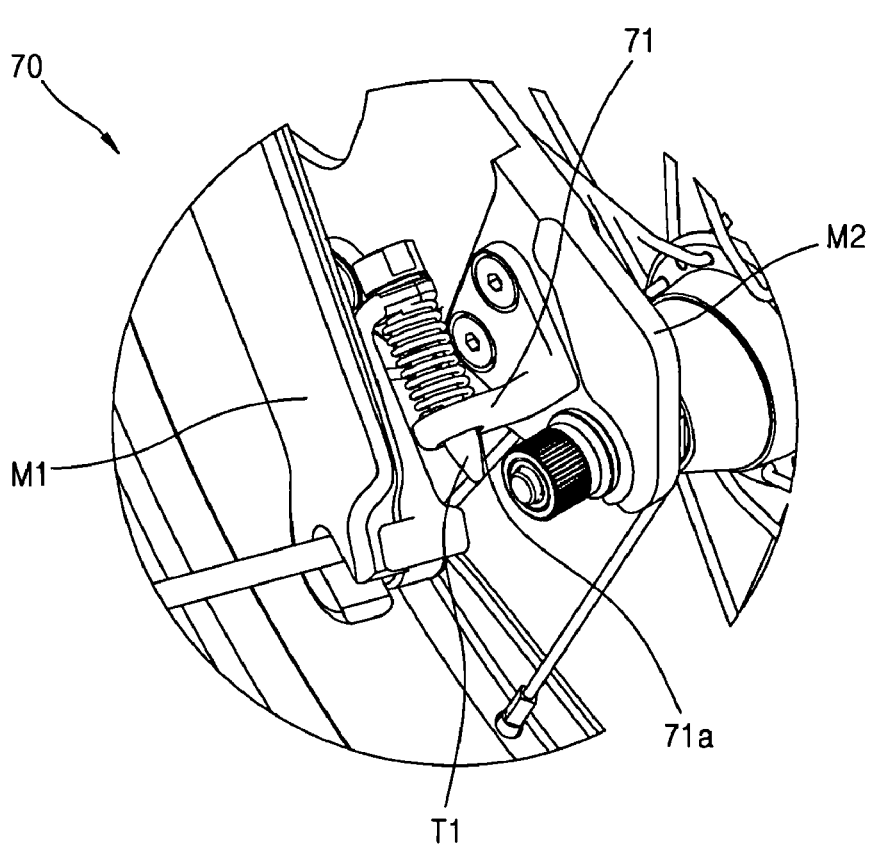
FIG. 25 is a perspective view and a cross-sectional view, respectively, illustrating a first fastening portion of a temporary fixing device of the separable bicycle of FIG. 1.
Figure 25B:
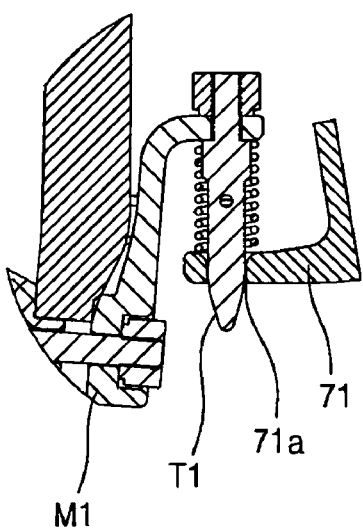

More specifically, for example, as shown in FIGS. 25A and 25B, the handle stem fixing device 60 may include a first lever 61 and a second lever 62. The first lever 61 has one end which is rotatably installed on one side of the head tube 10, a middle portion in which an alignment protrusion 61a, which is inserted into an alignment groove 11b, formed in the handle stem 11, during the tightening rotation in a direction of the handle stem 11, is formed, and the other end in which a first release lever 61b and a fastening protrusion 61c are formed. The second lever 62 has one end in which a hook 62s engaged with the fastening protrusion 61c of the first lever 61 is formed, a middle portion which is rotatably installed on the other side of the head tube 10, and the other end in which a second release lever 62b is formed.

Accordingly, a user may ensure that the handle stem 11 is always aligned in a correct position when riding. In addition, the first release lever 61b is engaged by the hook 62a and not be easily released, and because release may be achieved only by operating the second release lever 62a, more robust fixing is possible due to double safety, thereby further improving the safety of parts of the separable bicycle 1000.

Figure 26A:
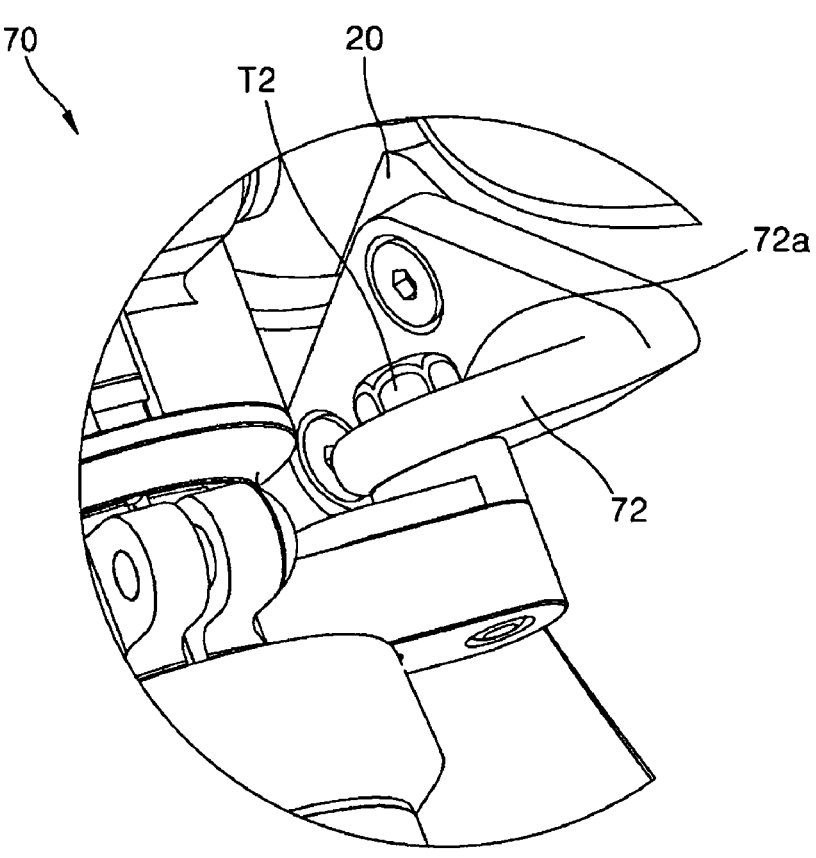
FIG. 26 is a perspective view and a cross-sectional view, respectively, illustrating a second fastening portion of the temporary fixing device of the separable bicycle of FIG. 1.
Figure 26B:
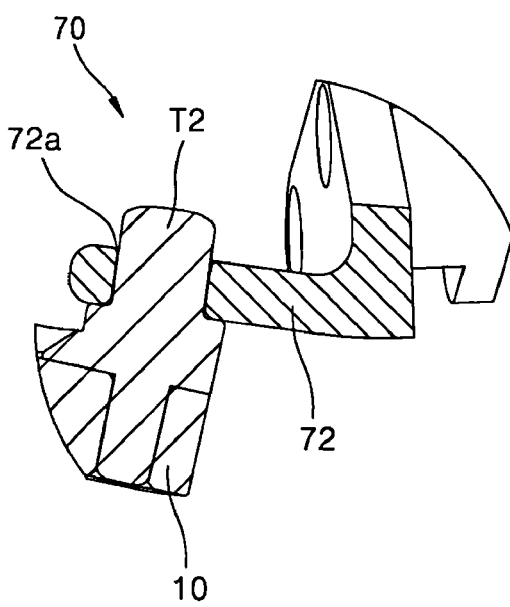
Figure 27A:
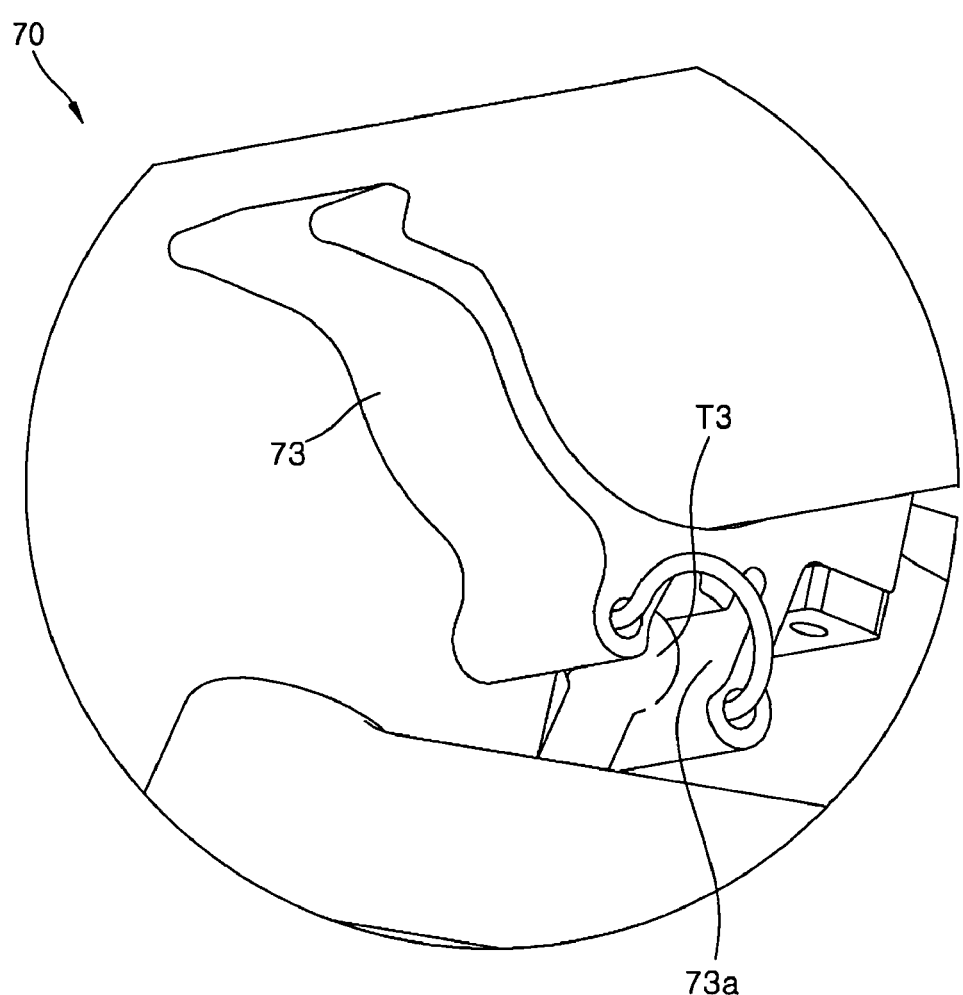
FIG. 27 is a perspective view and a cross-sectional view, respectively, illustrating a third fastening portion of the temporary fixing device of the separable bicycle of FIG. 1.
Figure 27B:
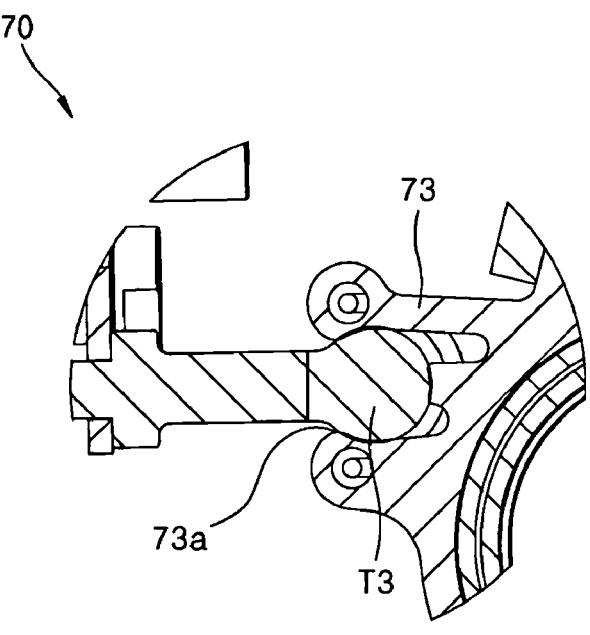

FIGS. 25A and 25B are a perspective view and a cross-sectional view, respectively, illustrating a first fastening portion 71 of a temporary fixing device 70 of the separable bicycle 1000 of FIG. 1, FIGS. 26A and 26B are a perspective view and a cross-sectional view, respectively, illustrating a second fastening portion 72 of the temporary fixing device 70 of the separable bicycle 1000 of FIG. 1, and FIGS. 27A and 27B are a perspective view and a cross-sectional view, respectively, illustrating a third fastening portion 73 of the temporary fixing device 70 of the separable bicycle 1000 of FIG. 1.

As shown in FIGS. 25A to 27B, the separable bicycle 1000 according to some embodiments of the present disclosure may include a device installed between the head tube 10 and the seat tube 20 to temporarily fix the front wheel and the rear wheel to each other in a three-point support form so that the front wheel and the rear wheel separated from each other are capable of being stored overlapping each other.

More specifically, for example, the temporary fixing device 70 may include a first fastening portion 71 shown in FIGS. 25A and 25B, a second fastening portion 72 shown in FIGS. 26A and 26B, and a third fastening portion 73 shown in FIGS. 27A and 27B. As shown in FIGS. 25A and 25B, the first fastening portion 71 is installed on one or more of a rear wheel mount portion M2, a seat stay 21, a chain stay 22, and a combination thereof, which rotationally support the rear wheel RW, and has a first insertion hole 71a corresponding to a tip of a first protrusion T1 so that the first protrusion T1, which is installed on a front wheel mount portion M1, is inserted into the first insertion hole 71a. As shown in FIGS. 26A and 26B, the second fastening portion 72 is installed in an upper portion of the seat tube 20 and has a second insertion hole 72a corresponding to a second protrusion T2 so that the second protrusion T2, which is installed in an upper portion of the head tube 10, is inserted into the second insertion hole 72a. As shown in FIGS. 27A and 27B, the third fastening portion 73 is installed in a lower portion of the seat tube 20 and has a third insertion groove 73a corresponding to a third protrusion T3 so that the third protrusion T3, which is installed on the front top bar 30-1, is forcedly inserted into the third insertion groove 73a.

More specifically, as shown in FIG. 2, the first protrusion T1 may be a conical elastic protrusion installed with a spring, and the first insertion hole 71a in FIG. 2 may be a circular hole. As shown in FIG. 3, the second protrusion T2 may be a round-headed hexagonal protrusion so that parts do not rotate with each other, and the second insertion hole 72a in FIG. 2 may be a hexagonal hole. The third protrusion T3 in FIG. 2 may be a spherical protrusion, and the third insertion groove 73a in FIG. 2 may be a force-fitting elastic string groove portion. Here, these holes and protrusions may be formed to have various shapes, and a pressing handle may be formed in the third insertion groove 73a to facilitate withdrawal of the third protrusion T3.

The separable bicycle frame 100 according to some embodiments of the present disclosure may include a head tube 10 capable of accommodating a handle stem 11 having a handle H installed thereon and connected to a front wheel FW, a seat tube 20 that is connected to a rear wheel RW by using a seat stay 21 or chain stay 22, accommodates a seat post SP on which a seat S is installed, and is capable of supporting a pedal P, a top frame 30 connecting an upper portion of the seat tube 20 to the head tube 10, and a down frame 40 connecting a lower portion of the seat tube 20 to the head tube 10. In order for the head tube 10 connected to the front wheel FW and the seat tube 20 connected to the rear wheel RW to be completely separated from each other, a top fastening portion TC may be installed in the middle of the top frame 30 and a down fastening portion DC may be installed in the middle of the down frame 40.

Here, the components of the separable bicycle frame 100 described above may have the same configurations and roles as those of the separable bicycle 1000 described above, and more detailed descriptions thereof will be omitted.

Therefore, a front wheel portion supporting the front wheel FW and a rear wheel portion supporting the rear wheel RW may be completely separated and thus may be transported and stored separately to thereby increase space utilization, it is possible to separate wires by using the wire separation device 50, the space may be reduced as much as possible by folding the frame once more by using a plurality of joints K1 to K5 when temporarily fixing the front and rear wheel portions to overlap each other after complete separation, a wheel alignment operation or a wire tension readjustment operation is unnecessary when reconnecting the front wheel portion to the rear wheel portion, thereby facilitating the use thereof, structurally strong strength and durability may be provided by using a reinforcing bar X, and alignment and fixing of the handle stem 11 may be performed easily.

Figure 28:
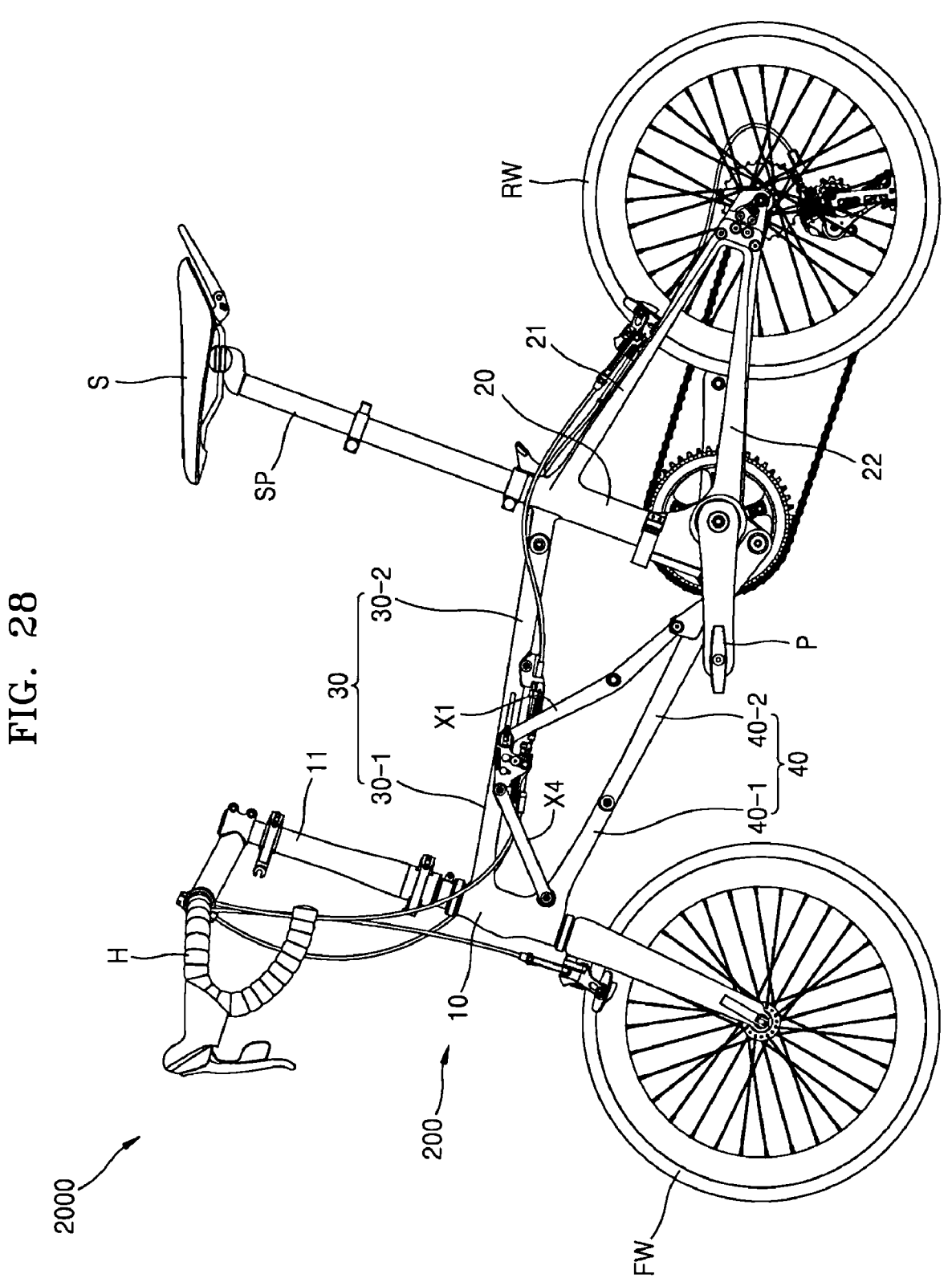
FIG. 28 is a side view of a separable bicycle according to some other embodiments of the present disclosure.

FIG. 28 is a side view of a separable bicycle 2000 according to some other embodiments of the present disclosure.

As shown in FIG. 28, the separable bicycle 2000 according to some other embodiments of the present disclosure may not include the second branch bar X2 and the third foldable bar X3 in the separable bicycle 1000 described above.

Accordingly, in the separable bicycle 2000 according to some other embodiments of the present invention, the weight thereof may be reduced by reducing the number of parts, and the product cost may be lowered by reducing assembly time and manpower. In addition, the present disclosure is not necessarily limited to the drawings, and various changes or modifications are possible.

Although the present disclosure has been described with reference to the embodiments shown in the drawings, which are merely exemplary, those of ordinary skill in the art will understand that various modifications and equivalent other embodiments are possible therefrom. Therefore, the true technical protection scope of the present disclosure should be determined by the technical spirit of the appended claims.

INDUSTRIAL APPLICABILITY

According to various embodiments of the present disclosure made as described above, a front wheel portion supporting a front wheel and a rear wheel portion supporting a rear wheel may be completely separated from each other, it is possible to completely separate wires by using a wire separation device, and the space may be reduced as much as possible by folding the frame once more by using a plurality of joints when temporarily fixing the front and rear wheel portions to overlap each other after complete separation. Therefore, space utilization and transport convenience of the separable bicycle of the present disclosure may be increased.

In addition, a wheel alignment operation or a wire tension readjustment operation may be unnecessary when reconnecting the front wheel portion to the rear wheel portion, thereby facilitating the use thereof, and structurally strong strength and durability may be provided by using a reinforcing bar in a frame structure in which the front wheel portion and the rear wheel portion may be separated and thus the life of the separable bicycle of the present disclosure may be increased.

The invention claimed is:

1. A separable bicycle comprising:
a head tube capable of receiving a handle stem;
a seat tube accommodating a seat post on which a seat is installed;
a top frame connecting an upper portion of the seat tube to the head tube; and
a down frame connecting a lower portion of the seat tube to the head tube,
wherein, in order for the head tube connected to a front wheel and the seat tube connected to a rear wheel to be completely separated from each other, a top fastening portion is installed in a middle of the top frame and a down fastening portion is installed in a middle of the down frame,
wherein the top frame includes:
a front top bar having one end connected to an upper portion of the head tube and the other end in which a first coupling portion is formed so that the other end is capable of being fastened by the top fastening portion; and
a rear top bar having one end connected to an upper portion of the seat tube using a first joint portion and the other end in which the top fastening portion fastened to the first coupling portion is formed, and
the down frame includes:
a front down bar having one end connected to a lower portion of the head tube and the other end in which a second coupling portion is formed so that the other end is capable of being fastened by the down fastening portion; and
a rear down bar having one end connected to a lower portion of the seat tube using a second joint portion and the other end in which the down fastening portion fastened to the second coupling portion is formed,
a reinforcing bar formed between the rear top bar and the rear down bar to reinforce strength and durability of the rear top bar and the rear down bar,
wherein the reinforcing bar comprises a first branch bar connecting a front of the rear top bar to a rear of the rear down bar using a third joint portion,
wherein the third joint portion is located before the second joint portion of the rear down bar,
wherein the rear top bar, the rear down bar, and the reinforcing bar are folded using the first joint portion, the second joint portion, and the third joint portion.

2. The separable bicycle of claim 1, wherein the first coupling portion is a C-shaped groove, and the second coupling portion is an inverted U-shaped groove.

3. The separable bicycle of claim 1, wherein
the reinforcing bar is formed in an X-shape or a diagonal shape as a whole between the rear top bar and the rear down bar to reinforce strength and durability of the rear top bar and the rear down bar.

4. The separable bicycle of claim 1, wherein the handle stem has a C-shaped stem groove formed on one side thereof in order to separate the handle stem from the head tube and turn the handle stem over so that a handle faces downward and to fasten the handle stem to a first fastening shaft of the rear top bar by a fastening lever.

5. The separable bicycle of claim 1, further comprising a temporary fixing device installed between the head tube and the seat tube to temporarily fix the front wheel and the rear wheel to each other such that the front wheel and the rear wheel separated from each other are capable of being stored overlapping each other.

6. The separable bicycle of claim 5, wherein the temporary fixing device includes:

a first fastening portion installed on one or more of a rear wheel mount portion, a seat stay, a chain stay, and a combination thereof, which rotationally support the rear wheel, and having a first insertion hole corresponding to a tip of a first protrusion such that the first protrusion, which is installed on a front wheel mount portion, is inserted into the first insertion hole;

a second fastening portion installed in an upper portion of the seat tube and having a second insertion hole corresponding to a second protrusion such that the second protrusion, which is installed in an upper portion of the head tube, is inserted into the second insertion hole; and a third fastening portion installed in a lower portion of the seat tube and having a third insertion groove corresponding to a third protrusion such that the third protrusion, which is installed on the front top bar, is forcedly inserted into the third insertion groove.

7. The separable bicycle of claim 6, wherein the first protrusion is a conical elastic protrusion installed with a spring and the first insertion hole is a circular hole, the second protrusion is a round-headed hexagonal protrusion or a polygonal protrusion and the second insertion hole is a hexagonal hole or a polygonal hole, and the third protrusion is a spherical protrusion and the third insertion groove is a force-fitting elastic string groove portion.

8. A separable bicycle comprising:

a head tube capable of receiving a handle stem;

a seat tube accommodating a seat post on which a seat is installed;

a top frame connecting an upper portion of the seat tube to the head tube; and a down frame connecting a lower portion of the seat tube to the head tube, wherein, in order for the head tube connected to a front wheel and the seat tube connected to a rear wheel to be completely separated from each other, a top fastening portion is installed in a middle of the top frame and a down fastening portion is installed in a middle of the down frame, wherein the top frame includes:

a front top bar having one end connected to an upper portion of the head tube and the other end in which a first coupling portion is formed so that the other end is capable of being fastened by the top fastening portion; and a rear top bar having one end connected to an upper portion of the seat tube using a first joint portion and the other end in which the top fastening portion fastened to the first coupling portion is formed, and the down frame includes:

a front down bar having one end connected to a lower portion of the head tube and the other end in which a second coupling portion is formed so that the other end is capable of being fastened by the down fastening portion; and a rear down bar having one end connected to a lower portion of the seat tube using a second joint portion and the other end in which the down fastening portion fastened to the second coupling portion is formed, a reinforcing bar formed between the rear top bar and the rear down bar to reinforce strength and durability of the rear top bar and the rear down bar, wherein the reinforcing bar comprises a first branch bar connecting a front of the rear top bar to a rear of the rear down bar or a lower side of the seat tube using a third joint portion, wherein the rear top bar, the rear down bar, and the reinforcing bar are folded using the first joint portion, the second joint portion, and the third joint portion, wherein the reinforcing bar further comprises:

a second branch bar formed between a front of the rear down bar to an upper side of the seat tube or a rear of the rear top bar; and a third foldable bar, which is linked between the seat tube and the second branch bar, wherein a fourth joint portion is formed at a rear of the second branch bar, and a fifth joint portion is formed at a rear of the third foldable bar.

9. A separable bicycle comprising:

a head tube capable of receiving a handle stem;

a seat tube accommodating a seat post on which a seat is installed;

a top frame connecting an upper portion of the seat tube to the head tube; and a down frame connecting a lower portion of the seat tube to the head tube, wherein, in order for the head tube connected to a front wheel and the seat tube connected to a rear wheel to be completely separated from each other, a top fastening portion is installed in a middle of the top frame and a down fastening portion is installed in a middle of the down frame, wherein the top frame includes:

a front top bar having one end connected to an upper portion of the head tube and the other end in which a first coupling portion is formed so that the other end is capable of being fastened by the top fastening portion; and a rear top bar having one end connected to an upper portion of the seat tube using a first joint portion and the other end in which the top fastening portion fastened to the first coupling portion is formed, and the down frame includes:

a front down bar having one end connected to a lower portion of the head tube and the other end in which a second coupling portion is formed so that the other end is capable of being fastened by the down fastening portion; and a rear down bar having one end connected to a lower portion of the seat tube using a second joint portion and the other end in which the down fastening portion fastened to the second coupling portion is formed, a reinforcing bar formed between the rear top bar and the rear down bar to reinforce strength and durability of the rear top bar and the rear down bar, wherein the reinforcing bar comprises a first branch bar connecting a front of the rear top bar to a rear of the rear down bar or a lower side of the seat tube using a third joint portion, wherein the rear top bar, the rear down bar, and the reinforcing bar are folded using the first joint portion, the second joint portion, and the third joint portion, wherein the separable bicycle further comprises a wire separation device installed on the top frame and capable of completely separating wires into a front wire and a rear wire, wherein the wire separation device includes:

a front fixing portion installed on the front top bar and having one side on which a guide rail is formed;

a front movable portion formed to be movable forward and backward along the guide rail of the front fixing portion and having one side on which a restraining protrusion is formed;

a tip protrusion installed on the front movable portion and to which the front wire is fixed with a fixing screw;

a rotating cam plate rotatable by being linked to a link shaft of the front fixing portion, an arc-shaped cam hole for constraining and guiding the restraining protrusion being formed on one side of the rotating cam plate so that the front movable portion is temporarily moved backward during rotation of the rotating cam plate and thus the tip protrusion is capable of being in a release mode;

a clasp that is capable of being engaged with the tip protrusion in a locking mode;

a rear movable portion that is movable forward and backward together with the clasp in the locking mode of the clasp and to which the rear wire is fixed;

a rear fixing portion installed on the rear top bar and in which a guide rod or guide rail capable of guiding forward and backward movement of the rear movable portion is formed; and a safety pressing pin having one side on which a body portion is formed and the other side on which a neck portion is formed, wherein the body portion corresponds to a wide portion of an arc-shaped multi-width hole formed in the rotation cam plate in normal times so that the rotation cam plate is capable of being rotated only during a pressing operation, and the neck portion is formed on the other side of the safety pressing pin so as to correspond to a narrow portion of the arc-shaped multi-width hole while moving backward during the pressing operation.

10. A separable bicycle comprising:

a head tube capable of receiving a handle stem;

a seat tube accommodating a seat post on which a seat is installed;

a top frame connecting an upper portion of the seat tube to the head tube; and a down frame connecting a lower portion of the seat tube to the head tube, wherein, in order for the head tube connected to a front wheel and the seat tube connected to a rear wheel to be completely separated from each other, a top fastening portion is installed in a middle of the top frame and a down fastening portion is installed in a middle of the down frame, wherein the top frame includes:

a front top bar having one end connected to an upper portion of the head tube and the other end in which a first coupling portion is formed so that the other end is capable of being fastened by the top fastening portion; and a rear top bar having one end connected to an upper portion of the seat tube using a first joint portion and the other end in which the top fastening portion fastened to the first coupling portion is formed, and the down frame includes:

a front down bar having one end connected to a lower portion of the head tube and the other end in which a second coupling portion is formed so that the other end is capable of being fastened by the down fastening portion; and a rear down bar having one end connected to a lower portion of the seat tube using a second joint portion and the other end in which the down fastening portion fastened to the second coupling portion is formed, a reinforcing bar formed between the rear top bar and the rear down bar to reinforce strength and durability of the rear top bar and the rear down bar, wherein the reinforcing bar comprises a first branch bar connecting a front of the rear top bar to a rear of the rear down bar or a lower side of the seat tube using a third joint portion, wherein the separable bicycle further comprises a handle stem fixing device fixing the handle stem to the head tube, wherein the handle stem fixing device includes:

a first lever having one end which is rotatably installed on one side of the head tube, a middle portion in which an alignment protrusion, which is capable of being inserted into an alignment groove, formed in the handle stem, during tightening rotation in a direction of the handle stem, is formed, and the other end in which a first release lever and a fastening protrusion are formed; and a second lever having one end in which a hook engaged with the fastening protrusion of the first lever is formed, a middle portion which is rotatably installed on the other side of the head tube, and the other end in which a second release lever is formed.

\* \* \* \* \*